United States Patent
Kahn

(10) Patent No.: US 10,443,782 B2
(45) Date of Patent: Oct. 15, 2019

(54) VIDEO WALL MOUNT

(71) Applicant: PEERLESS INDUSTRIES, INC., Aurora, IL (US)

(72) Inventor: Richard Kahn, Chicago, IL (US)

(73) Assignee: PEERLESS INDUSTRIES, INC., Aurora, IL (US)

(*) Notice: Subject to any disclaimer, the term of this patent is extended or adjusted under 35 U.S.C. 154(b) by 0 days.

(21) Appl. No.: 15/794,742

(22) Filed: Oct. 26, 2017

(65) Prior Publication Data

US 2019/0128472 A1 May 2, 2019

(51) Int. Cl.
| | |
|---|---|
| *F16M 11/10* | (2006.01) |
| *F16M 13/02* | (2006.01) |
| *F16M 11/20* | (2006.01) |
| *F16M 11/24* | (2006.01) |

(52) U.S. Cl.
CPC ............ *F16M 13/02* (2013.01); *F16M 11/10* (2013.01); *F16M 11/2092* (2013.01); *F16M 11/24* (2013.01); *F16M 2200/024* (2013.01); *F16M 2200/028* (2013.01); *F16M 2200/061* (2013.01); *F16M 2200/068* (2013.01)

(58) Field of Classification Search
CPC .......... F16M 2200/061; F16M 11/2092; A47B 97/001; A47B 2097/005
See application file for complete search history.

(56) References Cited

U.S. PATENT DOCUMENTS

| | | | |
|---|---|---|---|
| 7,523,907 | B2 | 4/2009 | Chen |
| D625,300 | S | 10/2010 | Stifal et al. |
| D634,311 | S | 3/2011 | Stifal et al. |

(Continued)

FOREIGN PATENT DOCUMENTS

| | | |
|---|---|---|
| CN | 201199412 Y | 2/2009 |
| CN | 201293191 | 8/2009 |

(Continued)

OTHER PUBLICATIONS

"LMV Video Wall Flat-Panel Framing System," Installation Instructions, Premier Mounts, copyright 2011,—https://www.mounts.com/Content/Manuals/LMV_958_1376091230.pdf, 14 pages.

(Continued)

*Primary Examiner* — Bradley Duckworth
(74) *Attorney, Agent, or Firm* — Foley & Lardner LLP

(57) ABSTRACT

A mounting system includes a surface mount, a device mount, an extension assembly, a latching panel assembly, and a latch assembly. The surface mount is configured to be coupled to a surface. The device mount is coupled to the surface mount and configured to be coupled to a device. The extension assembly is coupled to the surface mount and the device mount. The extension is configured to facilitate the selective repositioning of the device mount in an extended position and a retracted position. The latching panel assembly is operatively coupled to the device mount. The latching panel assembly includes a post. The latch assembly is operatively coupled to the surface mount and configured to selectively secure the device mount in the retracted position through an interaction with the post and includes a latch that is rotatable with respect to the surface mount in response to the interaction with the post.

20 Claims, 39 Drawing Sheets

(56) References Cited

U.S. PATENT DOCUMENTS

| | | | |
|---|---|---|---|
| 8,333,355 B2 | 12/2012 | Stifal et al. | |
| 8,523,129 B2 | 9/2013 | Stifal et al. | |
| 8,905,365 B2 | 12/2014 | Stifal et al. | |
| 9,339,113 B1 | 5/2016 | Cheng | |
| 9,395,043 B2 | 7/2016 | Stifal et al. | |
| 9,546,756 B1 * | 1/2017 | Hung | F16M 11/041 |
| 9,772,065 B2 | 9/2017 | Stifal et al. | |
| 10,159,345 B2 * | 12/2018 | Hung | F16M 11/041 |
| 2005/0274855 A1 | 12/2005 | Shin | |
| 2006/0125360 A1 * | 6/2006 | Kim | F16M 11/08 312/405.1 |
| 2008/0315049 A1 | 12/2008 | Bailo et al. | |
| 2009/0065667 A1 | 3/2009 | Bakkom et al. | |
| 2009/0159768 A1 | 6/2009 | Oh | |
| 2009/0194655 A1 | 8/2009 | Huang | |
| 2009/0256040 A1 | 10/2009 | Lee et al. | |
| 2010/0219315 A1 | 9/2010 | Muday et al. | |
| 2017/0059087 A1 | 3/2017 | Lam et al. | |
| 2018/0252357 A1 * | 9/2018 | Kahn | A47B 97/001 |

FOREIGN PATENT DOCUMENTS

| | | |
|---|---|---|
| CN | 101566268 A | 10/2009 |
| WO | WO-2009/033133 A1 | 3/2009 |
| WO | WO-2009/089178 A1 | 7/2009 |

OTHER PUBLICATIONS

"VW400M Mosaic Video Wall Mount for Displays With 400x400mm VESA Pattern," Crimson AV LLC, copyright 2014, 2 pages.

* cited by examiner

VIDEO WALL MOUNT

TECHNICAL FIELD

The present application relates generally to the field of mounting systems for audio-visual devices such as flat panel displays.

BACKGROUND

Various adjustable display mounts have been developed that facilitate adjustment of the position and/or orientation of an attached display in various degrees of freedom. Some of these adjustable display mounts facilitate movement of portions of the mount to reposition the location of a display in space relative to a mounting surface. Mounts may also allow an attached display to pivot about an axis and/or provide for adjustment of the rotational (i.e., skew) and/or tilt orientation of the display. Such display mounts enable gross positioning of a display device to obtain a preferred viewing position and orientation for the device relative to a viewer. Additionally, when a number of such displays are oriented in an array so that a "video wall" may be formed, adjustments of the individual mounts enable the individual displays to be properly aligned relative to each other, creating an appearance that more closely resembles a single, large, display.

SUMMARY

A mounting system includes a surface mount, a device mount, an extension assembly, a latching panel assembly, and a latch assembly. The surface mount is configured to be coupled to a surface. The device mount is coupled to the surface mount and configured to be coupled to a device. The extension assembly is coupled to the surface mount and the device mount. The extension is configured to facilitate the selective repositioning of the device mount in an extended position and a retracted position. The latching panel assembly is operatively coupled to the device mount. The latching panel assembly includes a post. The latch assembly is operatively coupled to the surface mount and configured to selectively secure the device mount in the retracted position through an interaction with the post. The latch assembly includes a latch that is rotatable with respect to the surface mount in response to the interaction with the post. The latch includes a guide and a wall. The guide extends from the latch. The wall extends from the latch. The guide and the wall cooperate to define a track therebetween. The track is configured to selectively receive the post such that the post is movable within the track. The track defines a first stop position, a second stop position, and a third stop position. The device mount is prevented from being brought closer to the surface mount by an interaction between the post and the wall when the post is located in the first stop position or the third stop position. The device mount is in the retracted position when the post is located in the second stop position.

In a second set of embodiments, a mounting system includes a surface mount, a device mount, and an extension assembly. The surface mount is configured to be coupled to a surface. The surface mount includes a first base plate, a mounting panel, and a latch. The mounting panel extends away from the first base plate. The latch is rotatably coupled to the mounting panel. The guide extends from the latch. The wall extends from the latch. The guide and the wall cooperate to define a track therebetween. The track defines a first stop position, a second stop position, and a third stop position. The device mount is operatively coupled to the surface mount and configured to be coupled to a device. The device mount includes a second base plate, a latching panel, and a post. The latching panel extends away from the second base plate. The post extends from the latching panel and is configured to be selectively received within the track such that the post is movable within the track. The post is selectively repositionable by the device mount to interface with the latch such that the device mount is selectively secured to, and released from, the surface mount. The extension assembly is operatively coupled to the surface mount and the device mount. The extension is configured to facilitate the selective repositioning of the device mount with respect to the surface mount. The device mount is prevented from being brought closer to the surface mount by an interaction between the post and the wall when the post is located in the first stop position or the third stop position. The device mount is prevented from being brought apart from the surface mount when the post is located in the second stop position.

In a third set of embodiments, a mounting system includes a surface mount, a device mount, and an extension assembly. The surface mount is configured to be coupled to a surface. The device mount is coupled to the surface mount. The device mount includes a base plate, a hook bracket, a mounting bracket, and a height adjustor. The hook bracket is operatively coupled to the base plate. The hook bracket includes a first slot, a second slot, and a third slot. The first slot receives a first fastener. The second slot receives a second fastener. The mounting bracket is operatively coupled to the hook bracket. The mounting bracket is configured to be coupled to a device. The mounting bracket includes a projection and a fourth slot. The projection extends from the mounting bracket. The fourth slot is positioned within the projection. The fourth slot receives the second fastener. The height adjustor is operatively coupled to the hook bracket and the mounting bracket. The height adjustor is movable relative to the hook bracket so as to cause repositioning of the mounting bracket relative to the hook bracket. The extension assembly is operatively coupled to the surface mount and the device mount. The third slot receives the projection. Movement of the first fastener within the first slot and movement of the second fastener within the second slot causes corresponding movement of the second fastener within the fourth slot.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
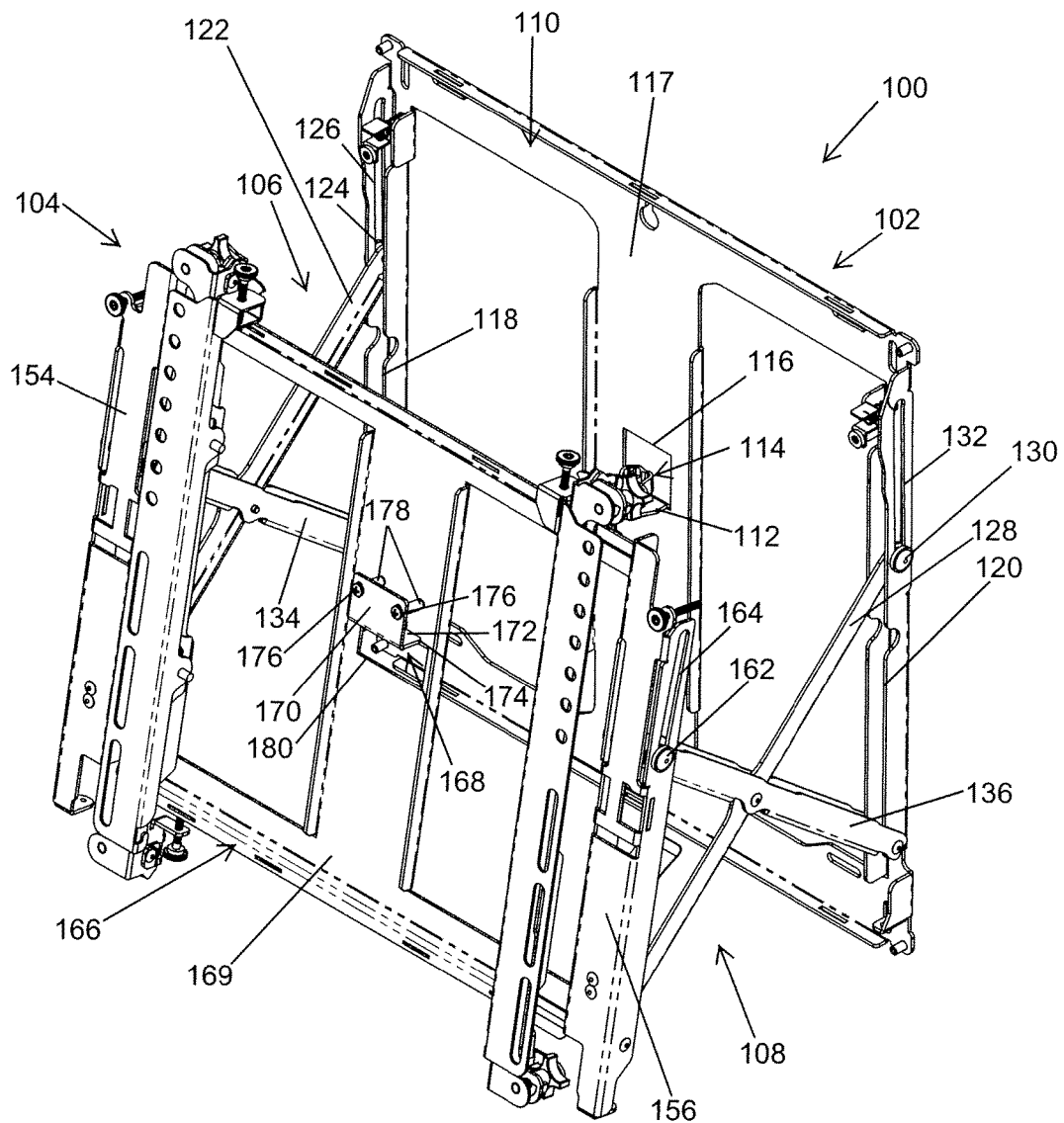
FIG. 1 is a perspective view of a mounting system, according to an exemplary embodiment, in a first position.

It will be recognized that some or all of the Figures are schematic representations for purposes of illustration. The Figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for a video wall mount. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Devices (e.g., a display panel, a flat panel display, a display device, a landscape display, a portrait display, a video display, a television, a monitor, a computer monitor, an electronic display, etc.) may be mounted to a surface (e.g., a wall, a mounting surface, a column, a pillar, a ceiling, etc.) using a mounting system. The mounting system may include a surface mount, which is mounted to a surface, and a device mount, which is mounted to a device, and hinge assemblies attached to both the surface mount and the device mount that allow the device mount to be extended from, and retracted towards, the surface mount.

Embodiments herein are directed to a mounting system where the surface mount incorporates a latch assembly and the device mount incorporates a latching panel assembly that is selectively coupled to the latch assembly when the device mount is retracted towards the surface mount. Specifically, the device mount includes a post and the surface mount includes a latch that defines a track through which the post may be guided to cause rotation of the latch. The track defines various stop positions where movement of the post within the track is impeded by the latch such that further movement of the device mount with respect to the surface mount is similarly impeded.

The mounting system described herein may also include mounting brackets in the device mount that couple the device mount to the device. The mounting brackets may be coupled to the device mount through hook brackets of the device mount. The device mount may include height adjustors that function to reposition the mounting brackets within the hook brackets such that the device may be repositioned. The mounting brackets and hook brackets may include various slots such that any binding which occurs from repositioning of the mounting brackets along the hook brackets (e.g., in a vertical direction, etc.) is mitigated by rotational repositioning of the mounting brackets with respect to the hook brackets. The mounting system described herein may be configured such that rotational repositioning occurs simultaneously with vertical repositioning and binding within the mounting system due to the vertical repositioning being substantially eliminated.

II. Overview of Mounting System

FIGS. 1-14 illustrate a mounting system 100 according to an example embodiment. The mounting system 100 is moveable (e.g., reconfigurable, repositionable, etc.) between a first positon (e.g., extended position, configuration, state, etc.), as shown in FIGS. 1-7, and a second position (e.g., collapsed position, retracted position, etc.), as shown in FIGS. 8-14.

The mounting system 100 includes a surface mount 102 configured to be selectively coupled (e.g., attached, fixed, fastened, etc.) to a surface. For example, the surface mount 102 may be coupled to the surface through the use of fasteners (e.g., screws, bolts, nails, etc.). The mounting system 100 also includes a device mount 104 configured to be selectively coupled to a device.

The mounting system 100 may be used to operatively attach one or more display devices to a surface, a stand (e.g., television stand, display stand, etc.), or a portable unit (e.g., rolling stand, rolling display, cart, etc.). Various portions of the mounting system 100 are selectively movable in relation to each other, such that the position and orientation of the attached display may be adjusted in a plurality of dimensions or degrees of freedom. The various features of the mounting system 100 provide for independent control of translational and rotational degrees of freedom of the attached display relative to the mounting surface. Through adjustment of the various features of the mounting system 100, optimization of the position and orientation of the attached display can be achieved relative to a mounting surface and/or adjacent displays, such as when the mounting system 100 is used in the context of a video wall application including an array of display devices.

The mounting system 100 also includes a first extension assembly 106 coupled to the surface mount 102 and the device mount 104, and a second extension assembly 108 coupled to the surface mount 102 and the device mount 104. The first extension assembly 106 and the second extension assembly 108 cooperate to selectively facilitate transition (e.g., extension, retraction, etc.) of the mounting system 100 between the first position and the second position. For example, both the first extension assembly 106 and the second extension assembly 108 may extend simultaneously as the mounting system 100 is transitioned from the second position to the first position. Similarly, both the first extension assembly 106 and the second extension assembly 108 may collapse simultaneously as the mounting system 100 is transitioned from the first position to the second position.

The surface mount 102 includes a base plate 110 that directly interfaces with the surface to which the surface mount 102 is coupled. The base plate 110 includes a mounting panel 112. The mounting panel 112 extends away (e.g., orthogonally, etc.) from the base plate 110 towards the device mount 104. For example, when the surface mount 102 is coupled to the surface, the mounting panel 112 may be substantially horizontal (e.g., orthogonal to the surface, parallel to a ground surface, etc.).

The surface mount 102 also includes a latch assembly 114 (e.g., locking assembly, etc.) coupled to the mounting panel 112. The latch assembly 114 may be centered on the base plate 110. For example, the latch assembly 114 may be centered on the base plate 110 in a lateral direction (e.g., a direction along the base plate 110 from the first extension assembly 106 to the second extension assembly 108, etc.) and/or a vertical direction (e.g., a direction from a bottom edge of the base plate 110 to a top edge of the base plate 110, etc.). As will be described in more detail herein, the latch assembly 114 selectively couples the device mount 104 to the surface mount 102 when the mounting system 100 is in the second position.

In an example embodiment, the base plate 110 includes an aperture 116 (e.g., opening, window, etc.) positioned adjacent the latch assembly 114 and contiguous with the mounting panel 112. The mounting panel 112 may, for example, be cut from the base plate 110 and formed by deflecting (e.g., bending, deforming, etc.) the mounting panel 112 relative to the base plate 110, thereby forming the aperture 116. The aperture 116 may facilitate rotation of the latch assembly 114 therein. The aperture 116 may also facilitate access to the latch assembly 114 through the base plate 110. The aperture 116 and the mounting panel 112 may be positioned along a central panel 117 of the base plate 110.

The surface mount 102 also includes a first channel 118 and a second channel 120. The first channel 118 and the second channel 120 may be coupled to, or be integral with, the base plate 110. A first member 122 of the first extension assembly 106 moves (e.g., slides, moves, transitions, etc.) within the first channel 118. The first member 122 includes a protrusion 124 (e.g., protuberance, extension, projection, etc.) extending from the first member 122 into a slot 126 in the first channel 118. The protrusion 124 is moveable within the slot 126 between a first position (e.g., a maximum position, etc.) and a second position (e.g., a minimum position, etc.). Similarly, a first member 128 of the second extension assembly 108 moves within the second channel 120. The first member 128 includes a protrusion 130 (e.g., protuberance, extension, projection, etc.) extending from the first member 128 into a slot 132 in the second channel 120. The protrusion 130 is moveable within the slot 132 between a first position and a second position.

The first extension assembly 106 also includes a second member 134 that is rotatably coupled to the first channel 118. The first member 122 and the second member 134 of the first extension assembly 106 are rotatably coupled (e.g., via a center pin, etc.) such that the protrusion 124 may be moved within the slot 126 relative to a location (e.g., fastener, etc.) where the second member 134 is rotatably coupled to the first channel 118. Similarly, the second extension assembly 108 also includes a second member 136 that is rotatably coupled to the second channel 120. The first member 128 and the second member 136 of the second extension assembly 108 are rotatably coupled (e.g., via a center pin, etc.) such that the protrusion 130 may be moved within the slot 132 relative to a location (e.g., fastener, etc.) where the second member 136 is rotatably coupled to the second channel 120.

Similar to the surface mount 102, the device mount 104 also includes a first channel 154 and a second channel 156. The second member 134 of the first extension assembly 106 moves within the first channel 154. The second member 134 includes a protrusion 158 (e.g., protuberance, extension, projection, etc.) extending from the second member 134 into a slot 160 in the first channel 154. The protrusion 158 is moveable within the slot 160 between a first position and a second position. Similarly, the second member 136 of the second extension assembly 108 moves within the second channel 156. The second member 136 includes a protrusion 162 (e.g., protuberance, extension, projection, etc.) extending from the second member 136 into a slot 164 in the second channel 156. The protrusion 162 is moveable within the slot 164 between a first position and a second position.

The first member 122 of the first extension assembly 106 is rotatably coupled to the first channel 154. The first member 122 and the second member 134 of the first extension assembly 106 are rotatably coupled (e.g., via a center pin, etc.) such that the protrusion 158 may be moved within the slot 160 relative to a location (e.g., fastener, etc.) where the first member 122 is rotatably coupled to the first channel 154. Similarly, the first member 128 of the second extension assembly 108 is rotatably coupled to the second channel 156. The first member 128 and the second member 136 of the second extension assembly 108 are rotatably coupled (e.g., via a center pin, etc.) such that the protrusion 162 may be moved within the slot 164 relative to a location (e.g., fastener, etc.) where the first member 128 is rotatably coupled to the second channel 156.

The device mount 104 includes a base plate 166. The first channel 154 and the second channel 156 may be coupled to, or be integral with, the base plate 166. The base plate 166 includes a latching panel assembly 168. The latching panel assembly 168 may be positioned along a central panel 169 of the base plate 166. The latching panel assembly 168 includes a first portion 170 and a second portion 172 that is contiguous with the first portion 170. In an example embodiment, the first portion 170 is disposed along (e.g., aligned along, centered on, etc.) a first plane and the second portion 172 is disposed along a second plane orthogonal to the first plane. In this way, the latching panel assembly 168 is L-shaped. The first portion 170 is disposed along a plane that is substantially parallel to a plane upon which the base plate 166 is disposed. The second portion 172 extends through a latch aperture 174 in the base plate 166 towards the surface mount 102. The latching panel assembly 168 is coupled to the base plate 166 through fasteners 176. The fasteners 176 extend from the base plate 166, through spacers 178 (e.g., bushings, washers, etc.), and into the first portion 170. The spacers 178 function to separate (e.g., space, etc.) the first portion 170 from the base plate 166.

The latch aperture 174 is contiguous with a central aperture 180, such that the latch aperture 174 extends from the central aperture 180, and vice versa. The central aperture 180 is configured (e.g., sized, shaped, etc.) to receive at least one of the latch assembly 114 and the mounting panel 112. As will be described in more detail herein, the latch assembly 114 and the mounting panel 112 each extend through the central aperture 180 when the mounting system 100 is in the second position.

Figure 2:
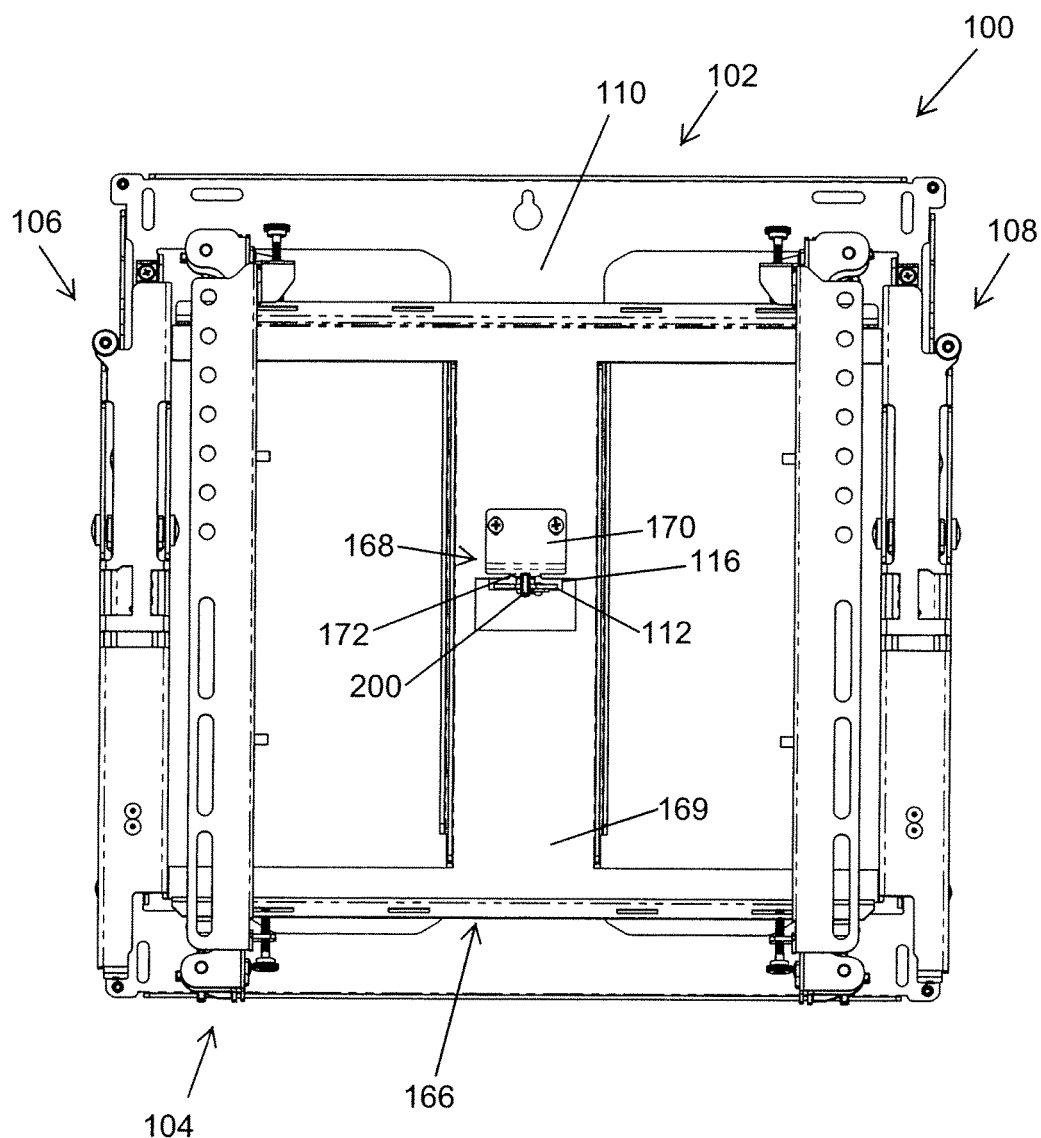
FIG. 2 is a front view of the mounting system shown in FIG. 1.
Figure 3:
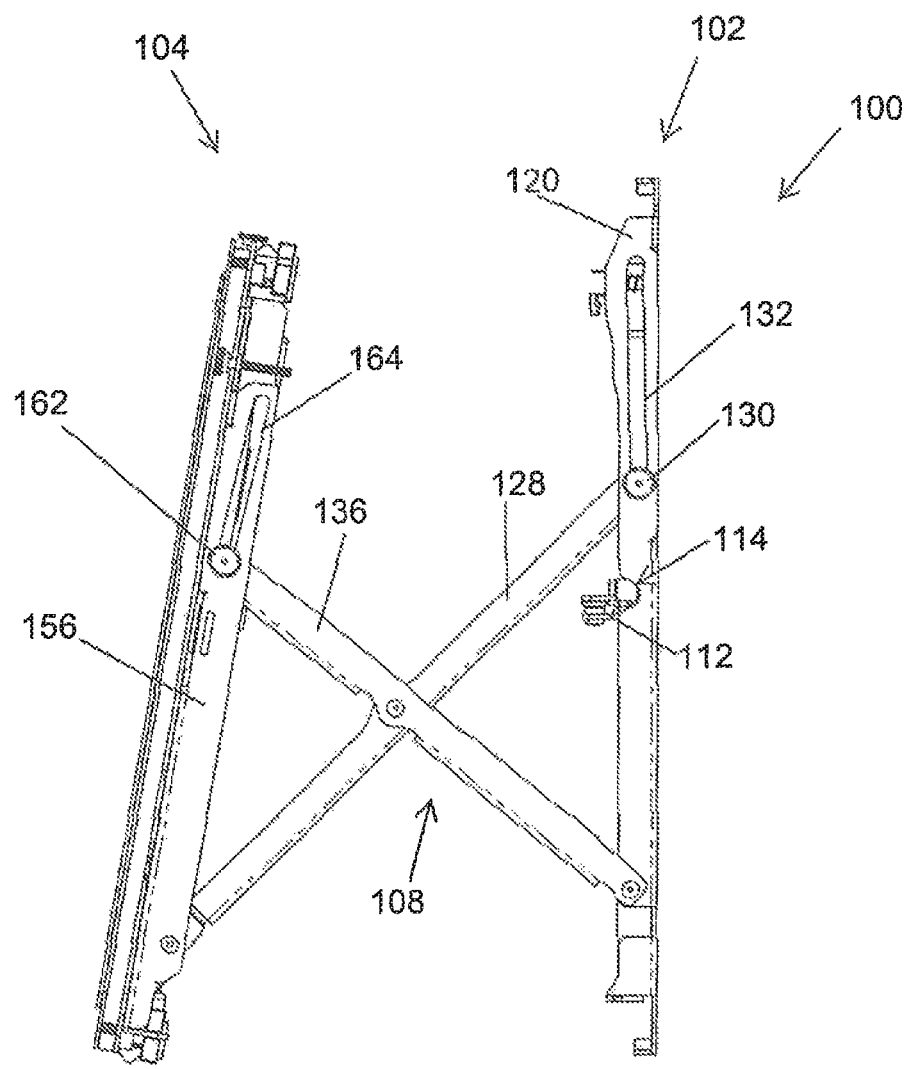
FIG. 3 is a right side view of the mounting system shown in FIG. 1.
Figure 4:
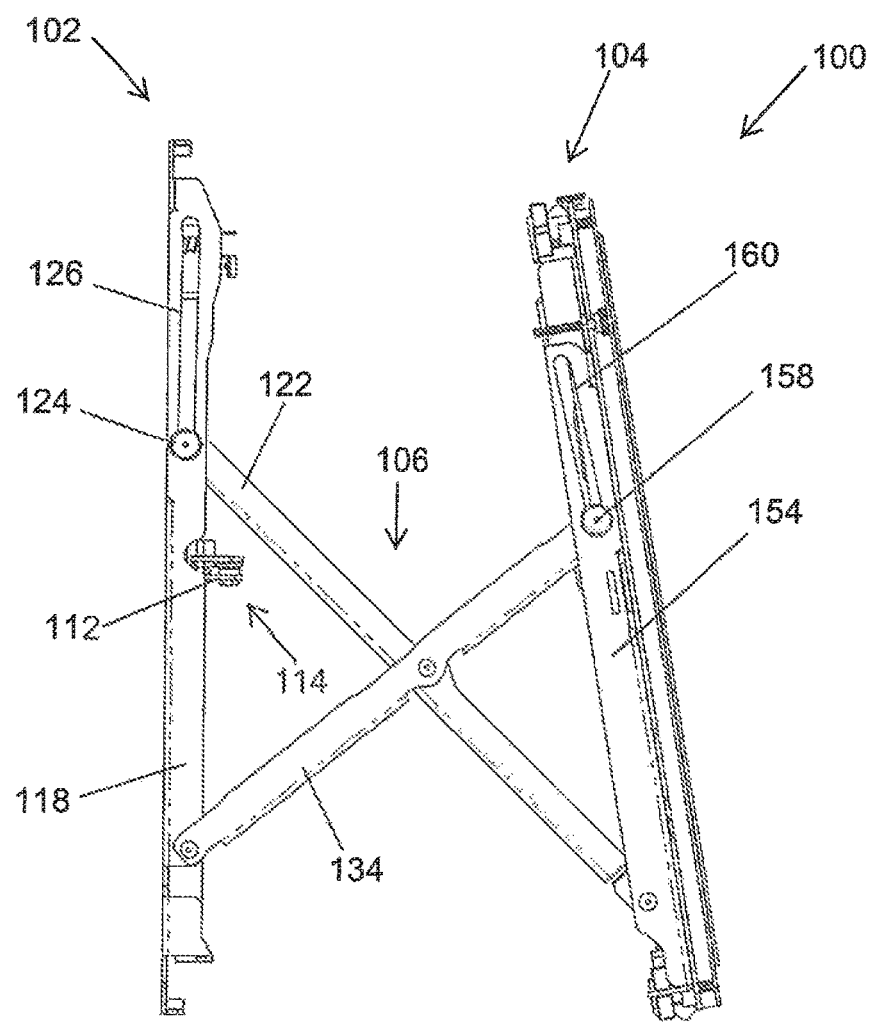
FIG. 4 is a left side view of the mounting system shown in FIG. 1.
Figure 5:
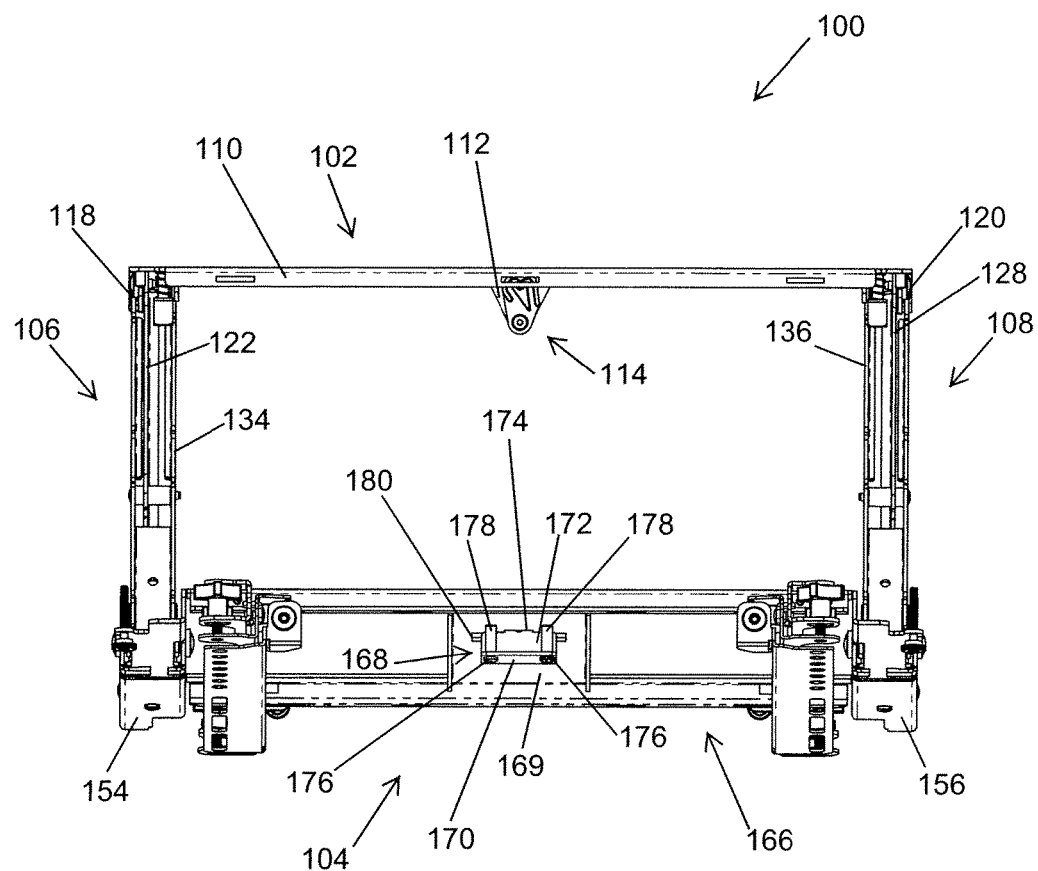
FIG. 5 is a top view of the mounting system shown in FIG. 1.
Figure 6:
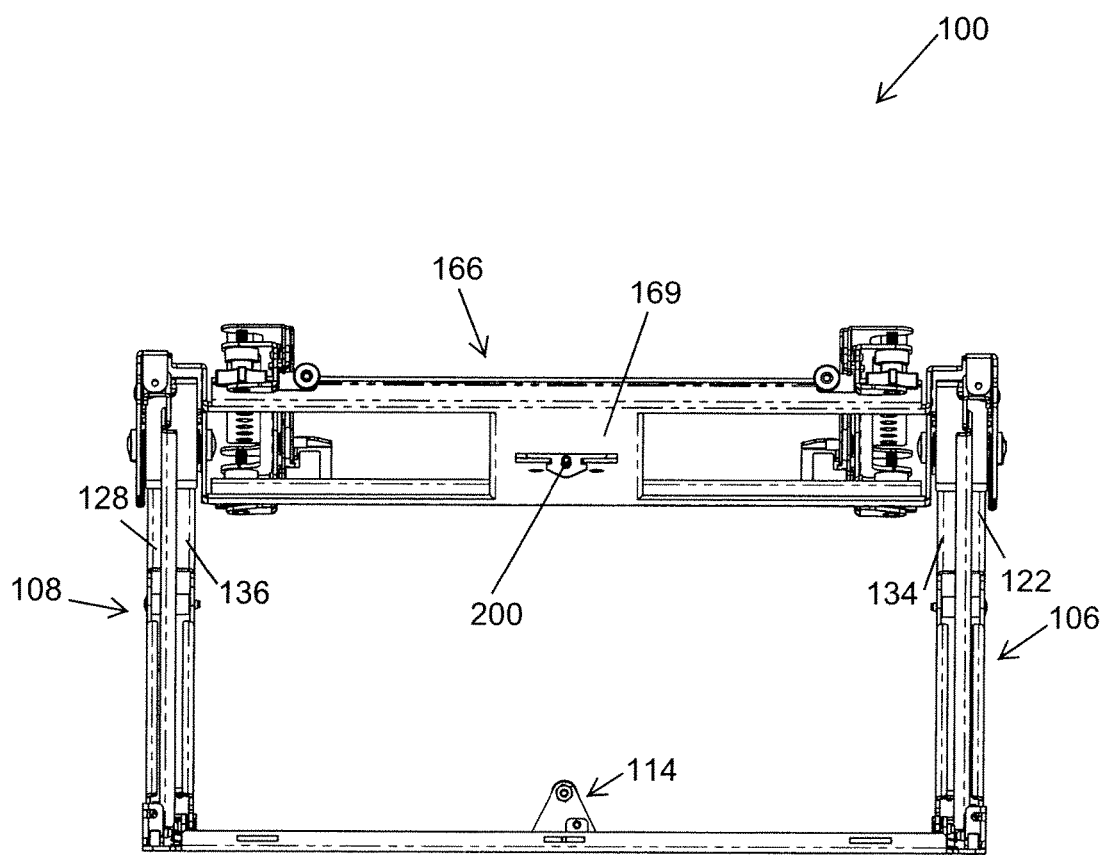
FIG. 6 is a bottom view of the mounting system shown in FIG. 1.
Figure 7:
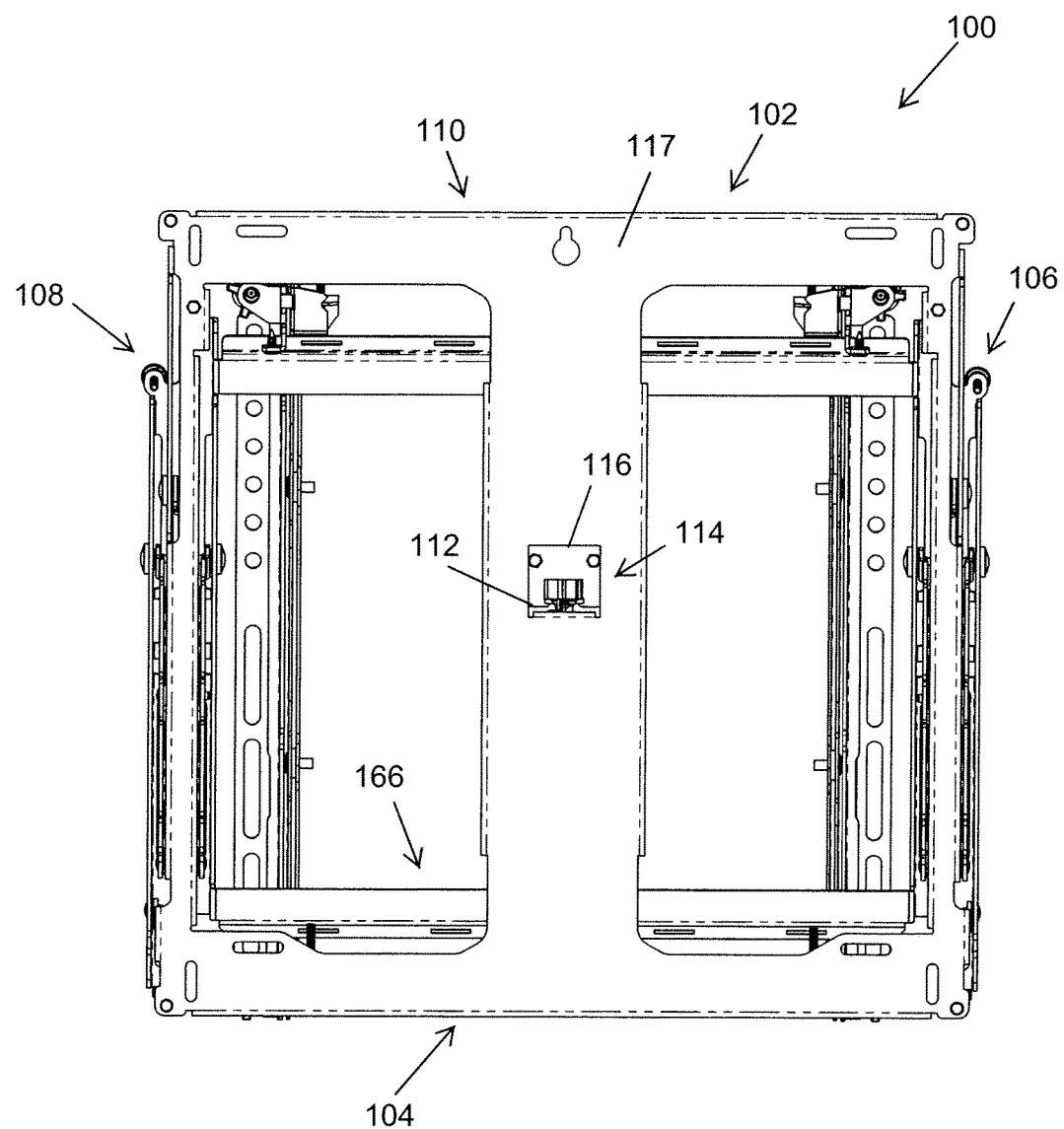
FIG. 7 is a rear view of the mounting system shown in FIG. 1.
Figure 8:
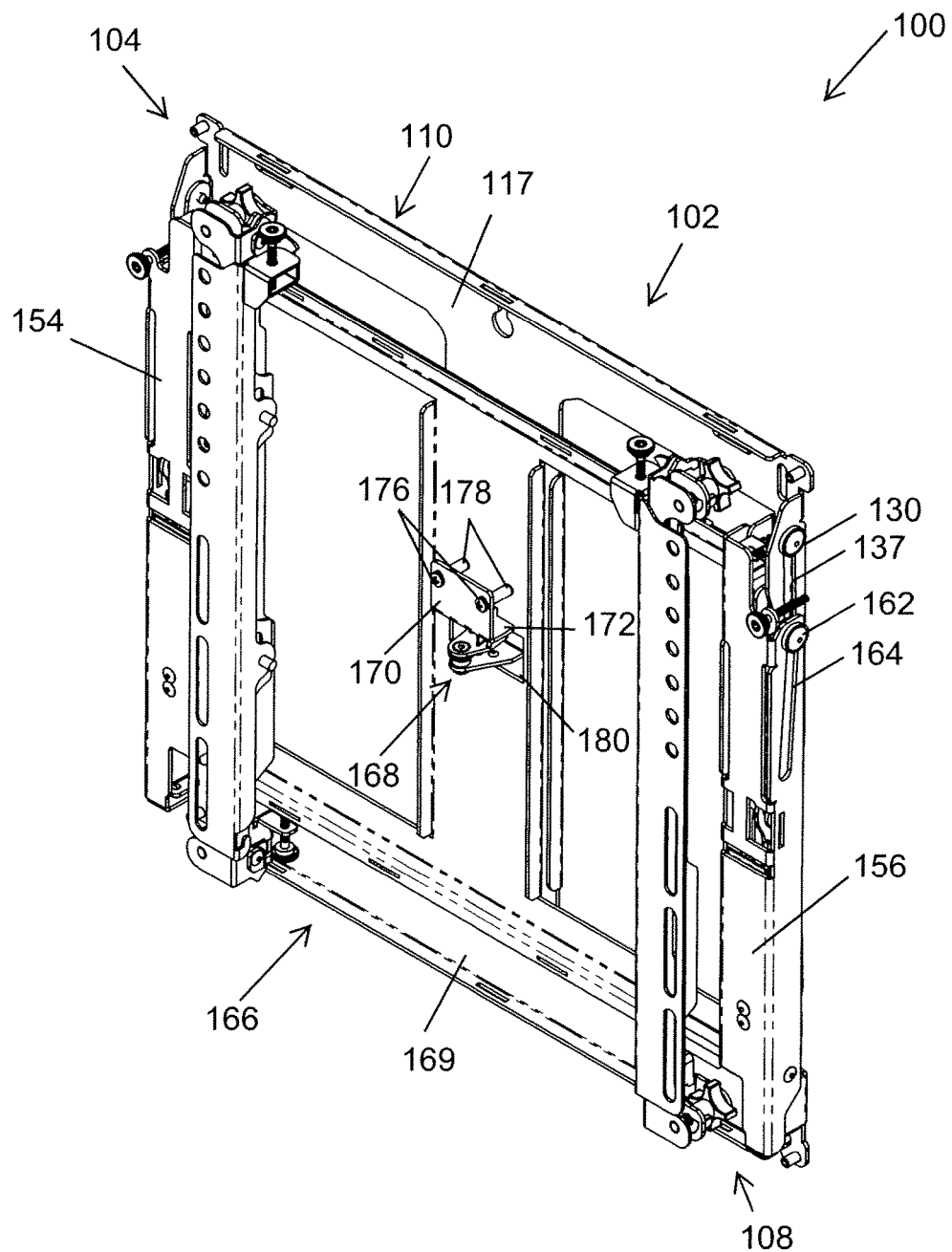
FIG. 8 is a perspective view of the mounting system shown in FIG. 1 in a second position.
Figure 9:
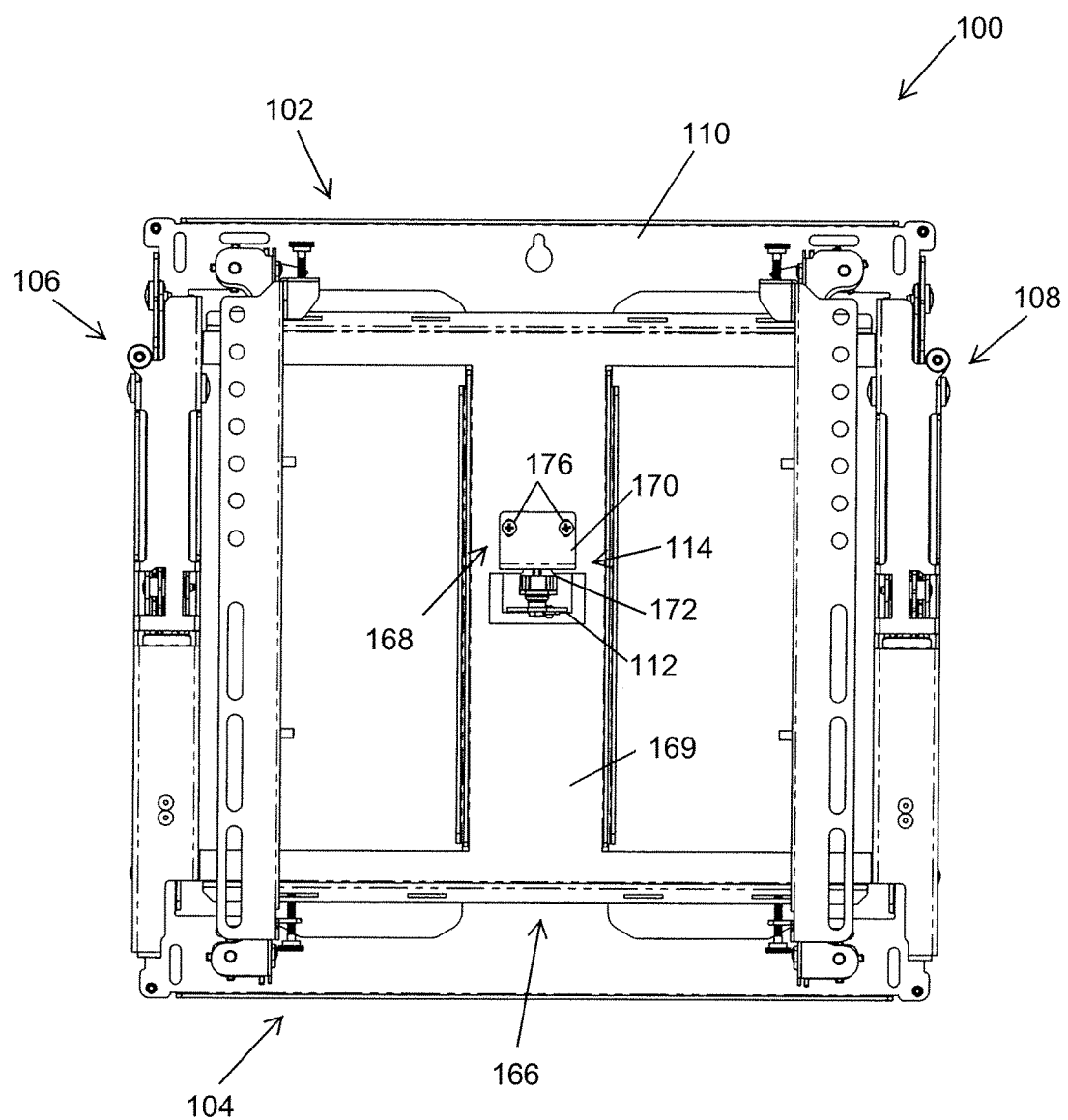
FIG. 9 is a front view of the mounting system shown in FIG. 8.
Figure 10:
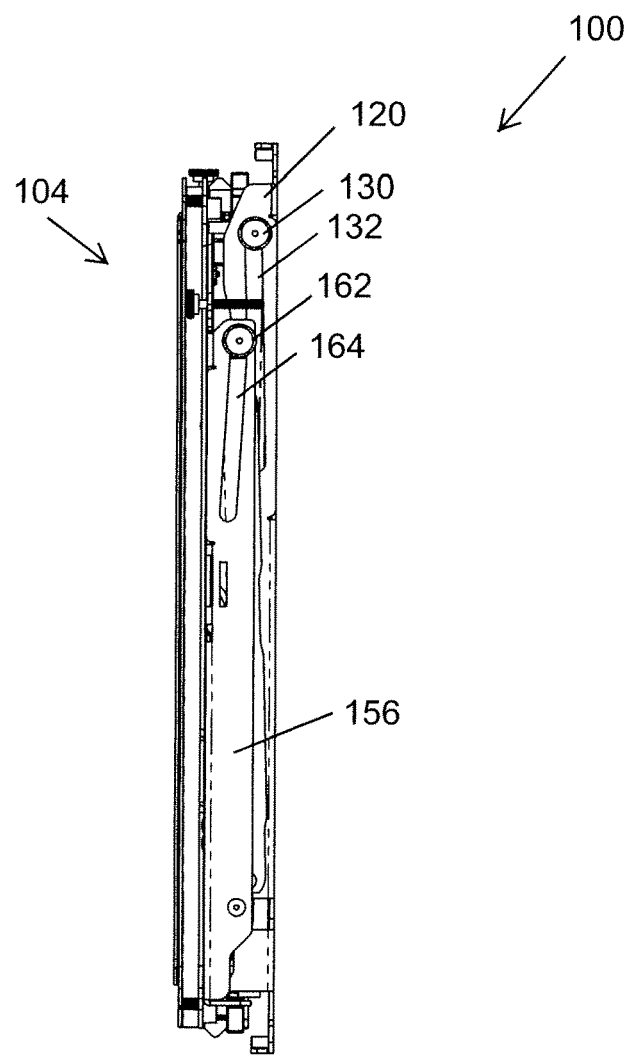
FIG. 10 is a right side view of the mounting system shown in FIG. 8.
Figure 11:
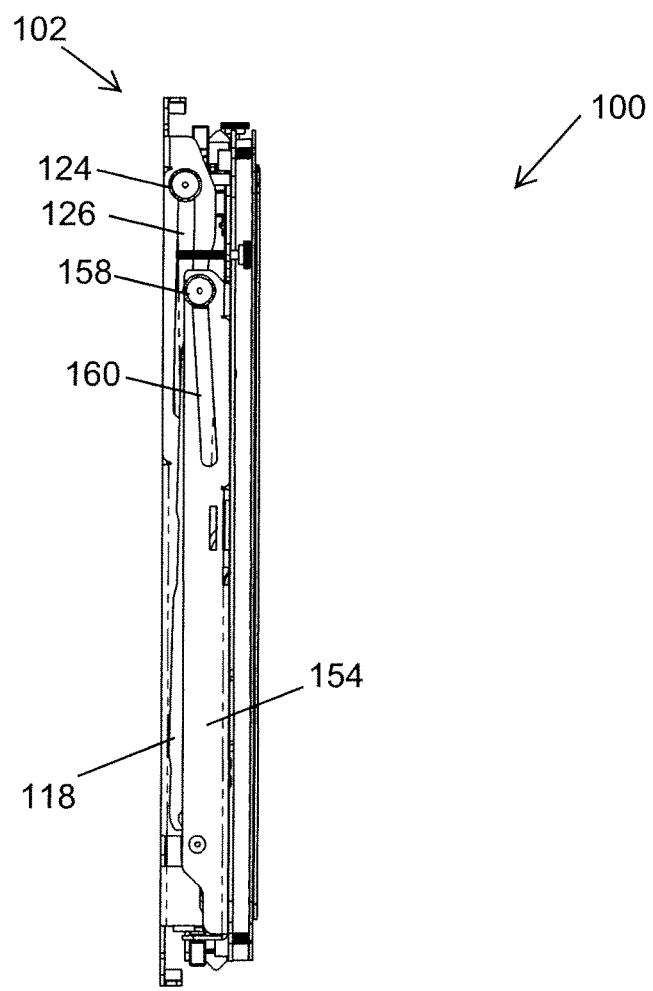
FIG. 11 is a left side view of the mounting system shown in FIG. 8.
Figure 12:
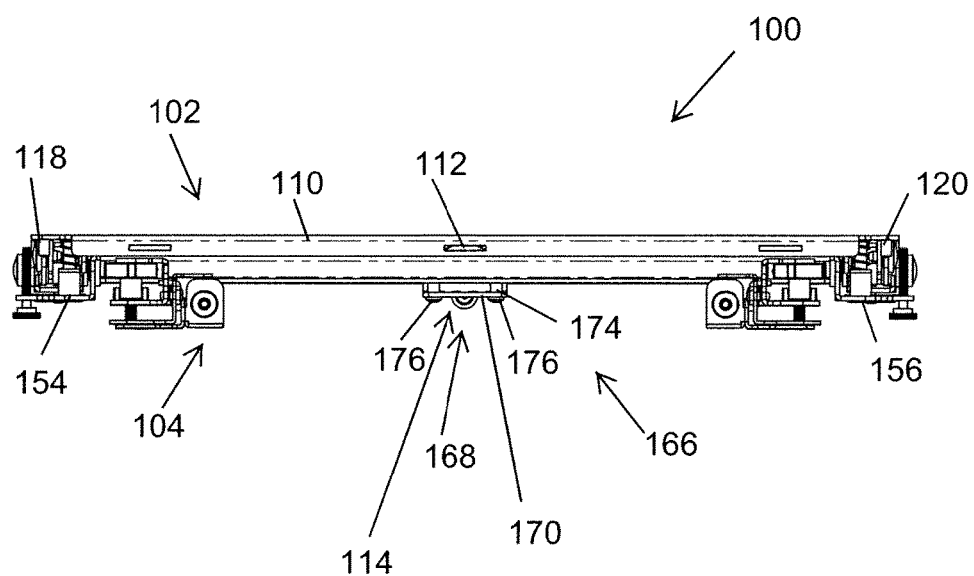
FIG. 12 is a top view of the mounting system shown in FIG. 8.
Figure 13:
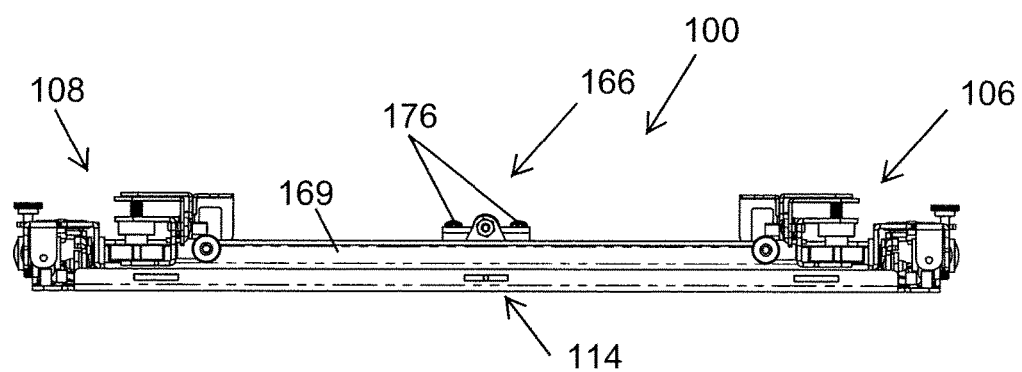
FIG. 13 is a bottom view of the mounting system shown in FIG. 8.
Figure 14:
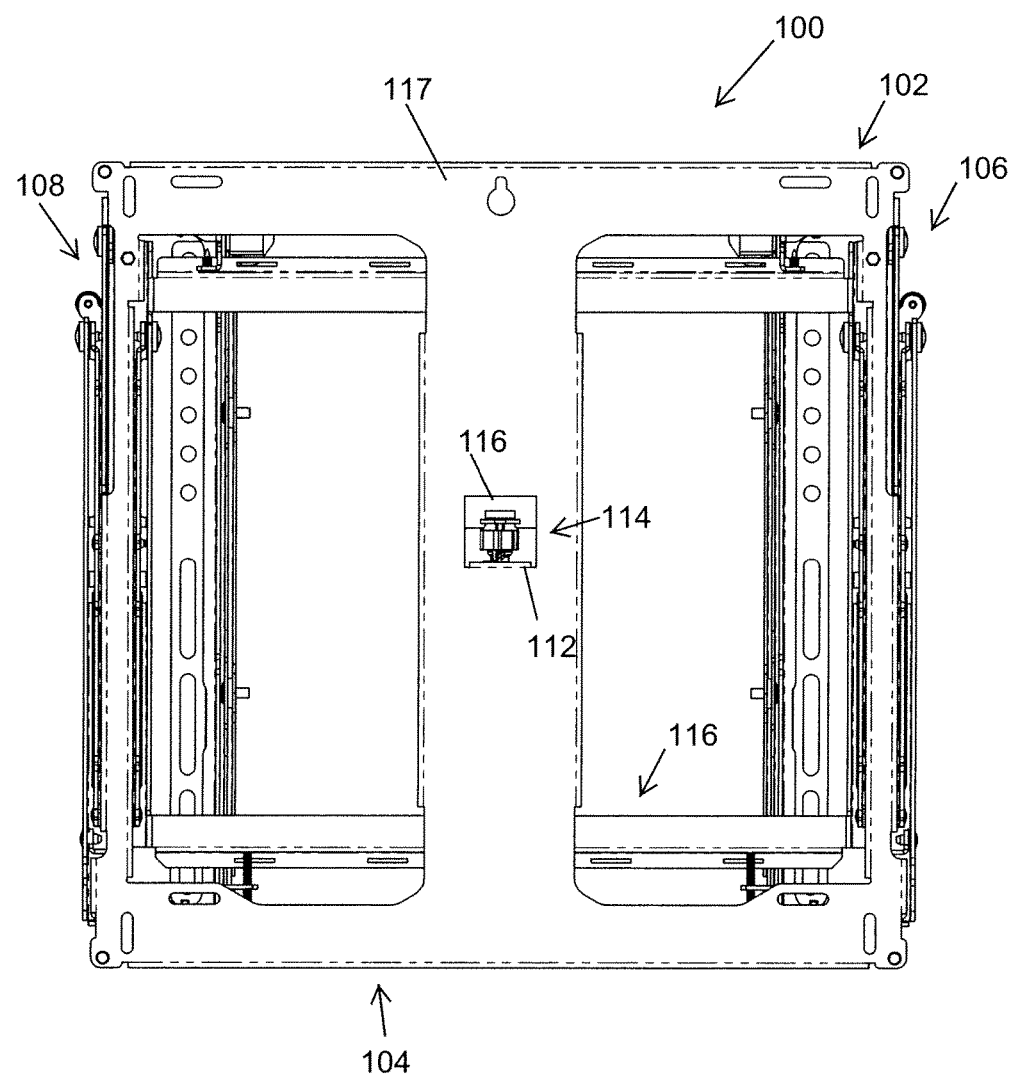
FIG. 14 is a rear view of the mounting system shown in FIG. 8.

As shown in FIG. 2, the latching panel assembly 168 also includes a post 200 (e.g., projection, protuberance, extension, pillar, etc.). The post 200 extends downwardly (e.g., toward a ground surface, etc.) from the second portion 172 of the latching panel assembly 168. In some embodiments, the post 200 extends away (e.g., orthogonally, etc.) from the second portion 172. However, in other embodiments the post 200 extends at an angle relative to the second portion 172. The post 200 interfaces with the latch assembly 114 such that the latching panel assembly 168 is selectively secured within the latch assembly 114 thereby preventing separation of the surface mount 102 and the device mount 104. As shown in FIG. 12, the latch assembly 114 extends beyond the first portion 170 when the mounting system 100 is in the second position. In some embodiments, the post 200 includes bearings, wheels, or other structures that facilitate rotation of the post 200 relative to the second portion 172.

Figure 15:
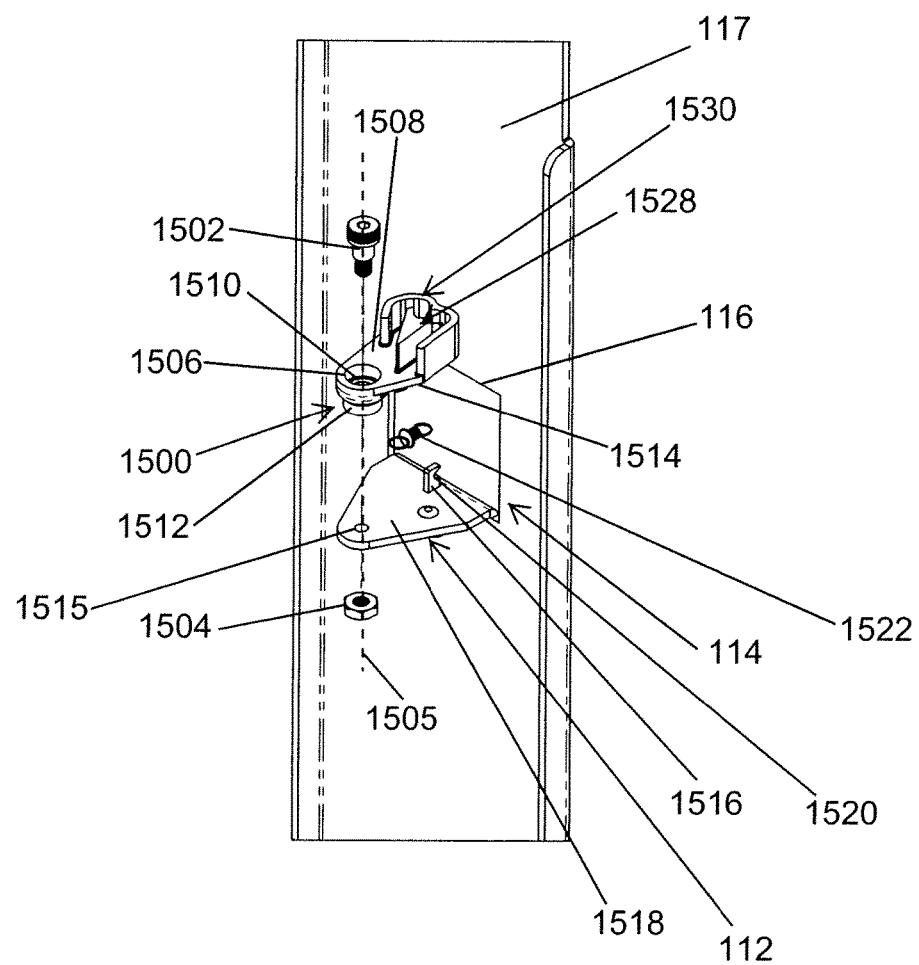
FIG. 15 is a perspective exploded view of a latch assembly for a mounting system, such as the mounting system shown in FIG. 1, according to an exemplary embodiment.
Figure 16:
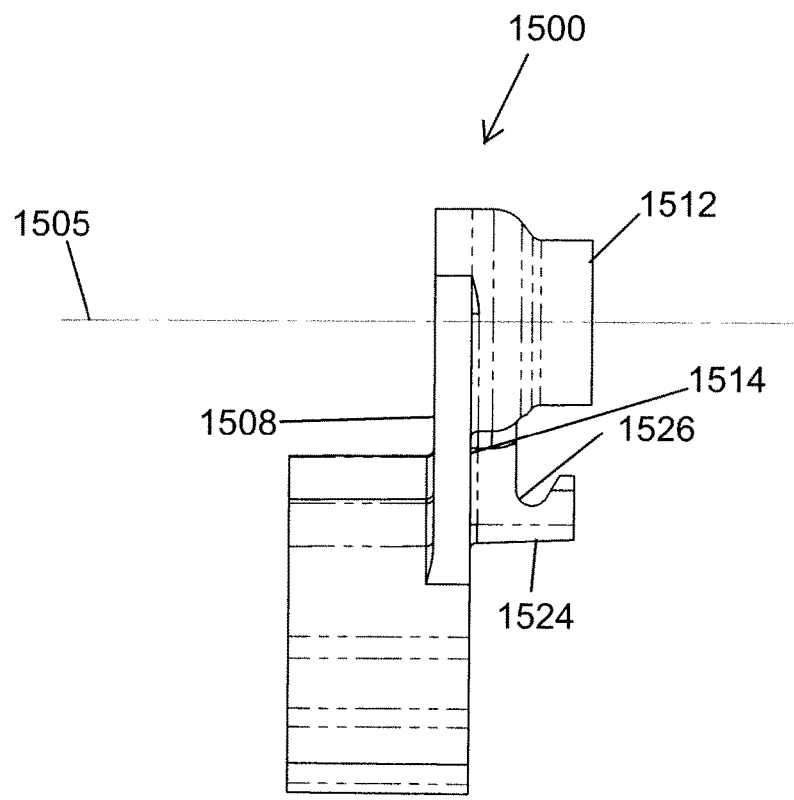
FIG. 16 is a right side view of a latch for a latch assembly, such as the latch assembly shown in FIG. 15, according to an exemplary embodiment.

FIG. 15 illustrates the latch assembly 114 in greater detail. The latch assembly 114 includes a latch 1500 (e.g., lock, pendant, member, etc.) that is rotatably coupled to the mounting panel 112. The latch 1500 is configured to selectively rotate in response to movement of the post 200 with respect to the latch 1500. Rotation of the latch 1500 is configured to selectively cause the latching panel assembly 168 to be secured within, and to be released from, the latch assembly 114.

The latch 1500 is rotatably coupled to the mounting panel 112 through a fastener 1502 (e.g., screw, etc.) and a nut 1504 (e.g., locking nut, etc.), such that the latch 1500 rotates about a rotational axis 1505. The fastener 1502 extends through an aperture 1506 in the latch 1500. The aperture 1506 extends from a top surface 1508 of the latch 1500 through a step 1510, and through a boss 1512 extending from a bottom surface 1514 of the latch 1500. The fastener 1502 may be countersunk within the step 1510, such that a head of the fastener 1502 is located below the top surface 1508

To couple the latch 1500 to the mounting panel 112, the fastener 1502 is inserted through the aperture 1506 in the latch 1500 and through an aperture 1515 in the mounting panel 112, the nut 1504 is coupled to the fastener 1502, and the nut 1504 is tightened on the fastener 1502 such that a head of the fastener 1502 contacts the step 1510 and the nut 1504 contacts the mounting panel 112 thereby causing contact between the step 1510 and the mounting panel 112. While not shown, the latch 1500 may incorporate washers, spacers, bushings, or other similar mechanisms positioned on the fastener 1502. For example, a washer may be positioned between the mounting panel 112 and the latch 1500.

The latch assembly 114 includes a retainer 1516 that extends from a top side 1518 of the mounting panel 112. The retainer 1516 defines a catch 1520 (e.g., groove, slot, slit, etc.) in a rearward face of the retainer 1516. The catch 1520 is configured to receive a biasing member 1522. The latch 1500 includes a retainer 1524 that extends from the bottom surface 1514 of the latch 1500. The retainer 1524 includes a catch 1526 that is configured to receive the biasing member 1522. The biasing member 1522 functions to selectively couple the retainer 1524 and the retainer 1516 such that the latch 1500 is biased to a first (e.g., home, rest, etc.) rotational position. The biasing member 1522 is configured to resist rotation of the latch 1500 away from the first rotational position and to assist rotation of the latch 1500 towards the first rotational position.

The latch 1500 includes a guide 1528 and a wall 1530 extending from the top surface 1508 of the latch 1500. The guide 1528 and the wall 1530 each define various surfaces that interact with the post 200 as the mounting system 100 is transitioned between the first position and the second position. During the transition of the mounting system 100 between the first position and the second position, the post 200 is selectively repositioned along a path 1532. The path 1532 intersects the rotational axis 1505 and bisects the guide 1528 when the latch 1500 is in the first rotational position.

Figure 17:
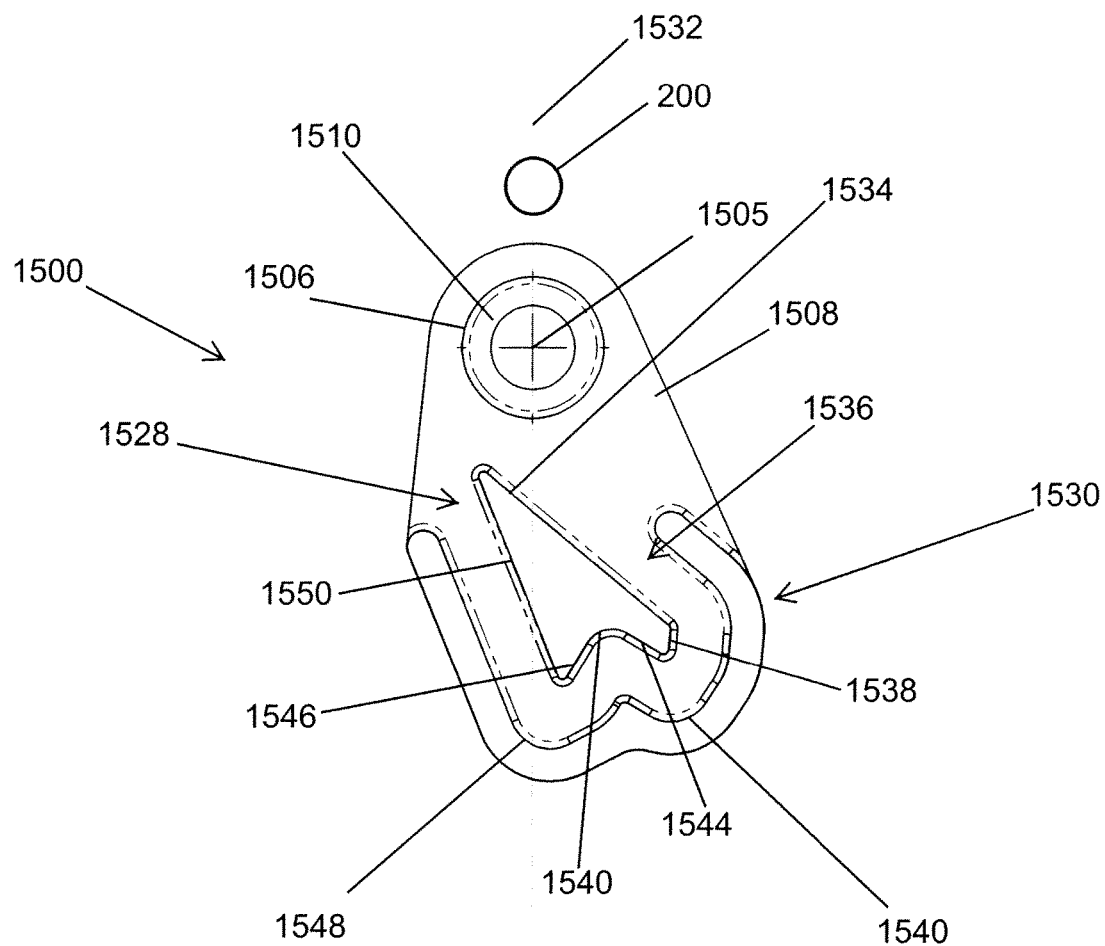
FIG. 17 is a top view of a latch assembly, such as the latch assembly shown in FIG. 15, in a first rotational position, according to an exemplary embodiment.

The latch 1500, the post 200, and the path 1532 are shown in FIGS. 17-22 with other components of the mounting system 100 being hidden. FIG. 17 illustrates the latch 1500 in the first rotational position. The latch 1500 may be in the first rotational position when the mounting system 100 is in the first position. As the surface mount 102 and device mount 104 are brought together, the post 200 is transitioned along the path 1532 towards the latch 1500, across the top surface 1508 of the latch 1500, over the aperture 1506, and into contact with a first side 1534 of the guide 1528. Contact between the post 200 and the first side 1534 of the guide 1528 causes the latch 1500 to be rotated clockwise about the rotational axis 1505 when a moment provided from the post 200 on the first side 1534, and thereby on the latch 1500, exceeds a moment provided by the biasing member 1522 on the retainer 1524, and thereby on the latch 1500.

Figure 18:
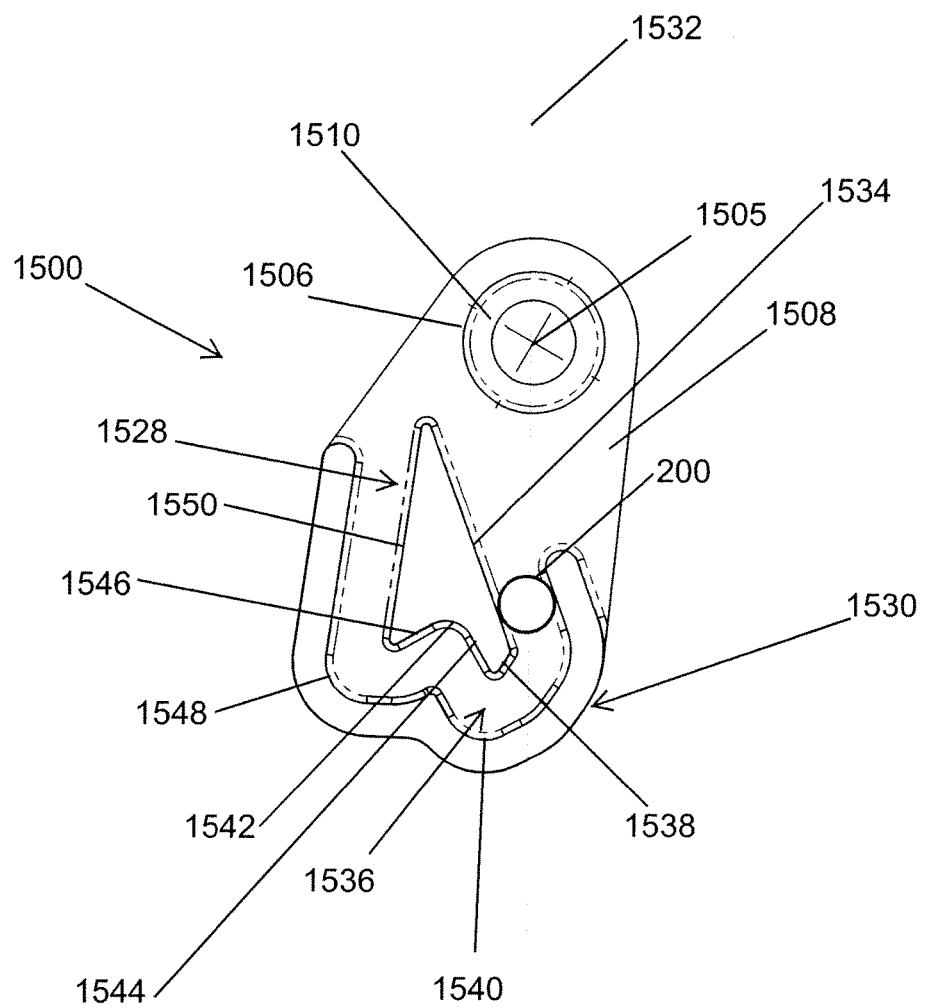
FIG. 18 is a top view of a latch assembly, such as the latch assembly shown in FIG. 15, in a second rotational position, according to an exemplary embodiment.

As the surface mount 102 and device mount 104 are brought further together, the post 200 transitions (e.g., slides, etc.) along the first side 1534 of the guide 1528 and into a track 1536 defined between the guide 1528 and the wall 1530. While the post 200 is in the track 1536, the post 200 may variously contact the guide 1528 and the wall 1530. For example, the post 200 may contact both the guide 1528 and the wall 1530 simultaneously or exclusively. FIG. 18 illustrates the post 200 in the track 1536 between the first side 1534 of the guide 1528 and the wall 1530.

As the surface mount 102 and device mount 104 are brought still further together, the post 200 is guided through the track 1536 such that the post 200 contacts or is proximate a second side 1538 of the guide 1528. Once the post 200 no long contacts the first side 1534, the post 200 is guided by the resistance provided by the biasing member 1522 which causes the latch 1500 to be rotated counter-clockwise and into contact with the second side 1538. The second side 1538 of the guide 1528 is contiguous with the first side 1534.

Figure 19:
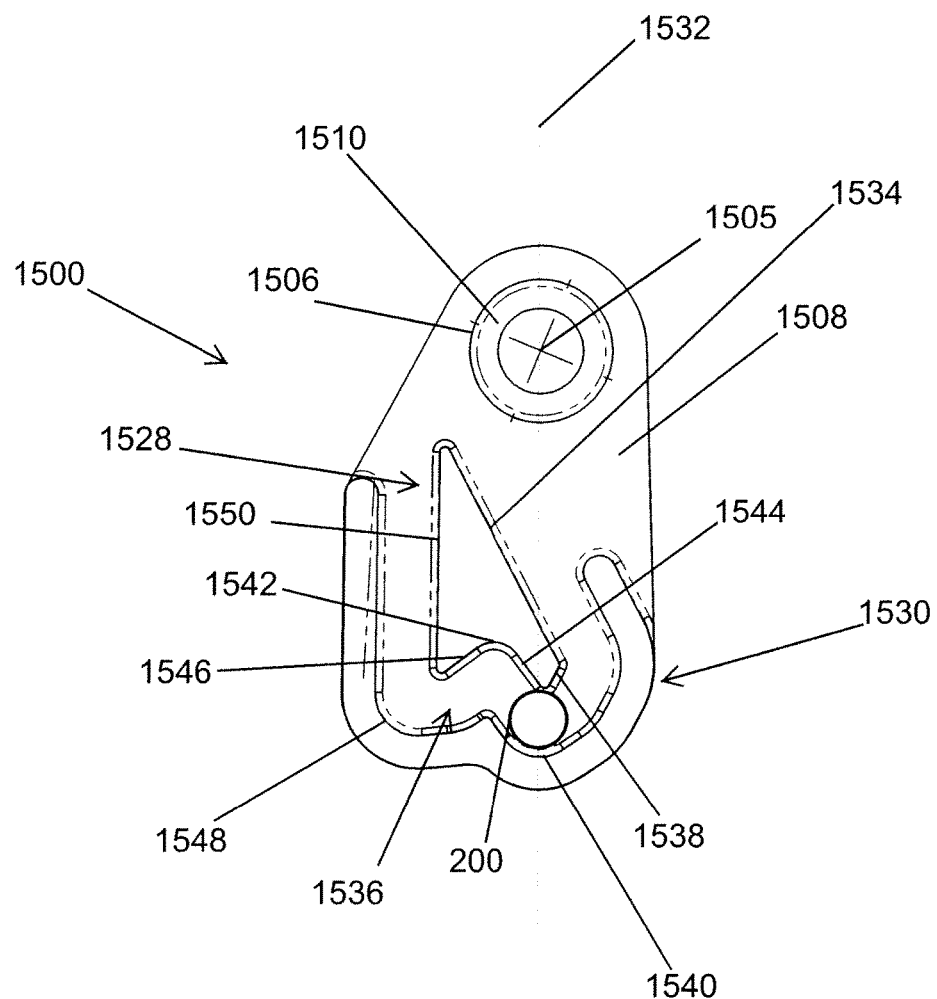
FIG. 19 is a top view of a latch assembly, such as the latch assembly shown in FIG. 15, in a third rotational position, according to an exemplary embodiment.

As the surface mount 102 and device mount 104 are brought still further together, the post 200 is guided through the track 1536 such that the post 200 no longer contacts the second side 1538, and is brought into contact with a valley 1540 in the wall 1530. Contact between the post 200 and the valley 1540 prevents the surface mount 102 and the device mount 104 from being brought further together. In this way, the valley 1540 provides a position at which the post 200 is bottomed out. FIG. 19 illustrates the post 200 in the valley 1540.

Figure 20:
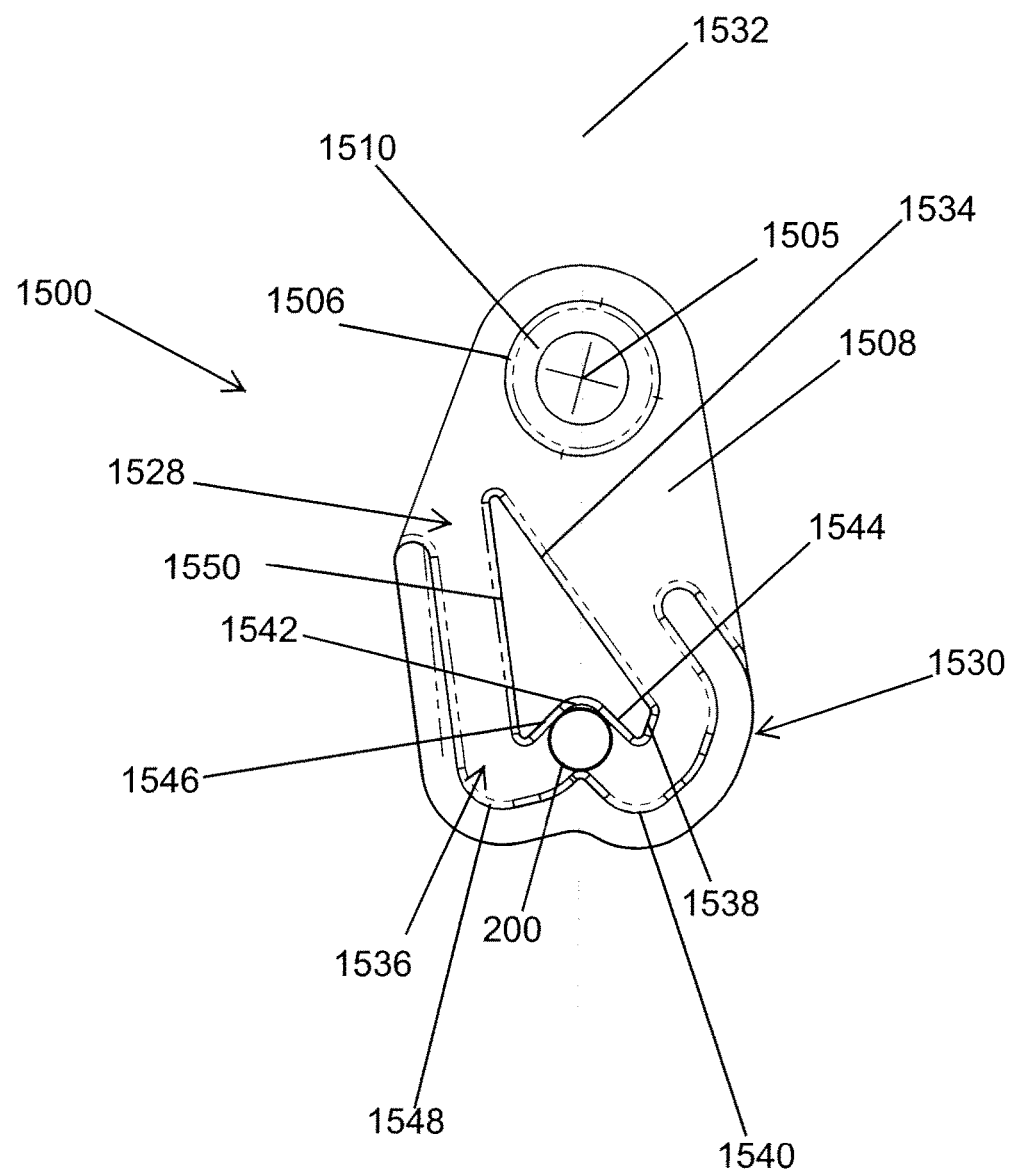
FIG. 20 is a top view of a latch assembly, such as the latch assembly shown in FIG. 15, in a fourth rotational position, according to an exemplary embodiment.

When a force biasing the surface mount 102 and the device mount 104 together, such as when a user releases the device mount 104, the latch 1500 is rotated counter clockwise. The post 200 is then guided through the track 1536 such that the post 200 no longer contacts the valley 1540 in the wall 1530, and is instead brought into contact with a valley 1542 in the guide 1528. The valley 1542 is positioned between a third side 1544 which is contiguous with the second side 1538, and a fourth side 1546. When the post 200 is in the valley 1542, the device mount 104 is held relative to the surface mount 102 such that the device mount 104 and the surface mount 102 are prevented from being separated. In this way, the valley 1542 provides a position at which the post 200 may be maintained. When the mounting system 100 is in the second position, the post 200 is in the valley 1542. FIG. 20 illustrates the post 200 in the valley 1542.

Figure 21:
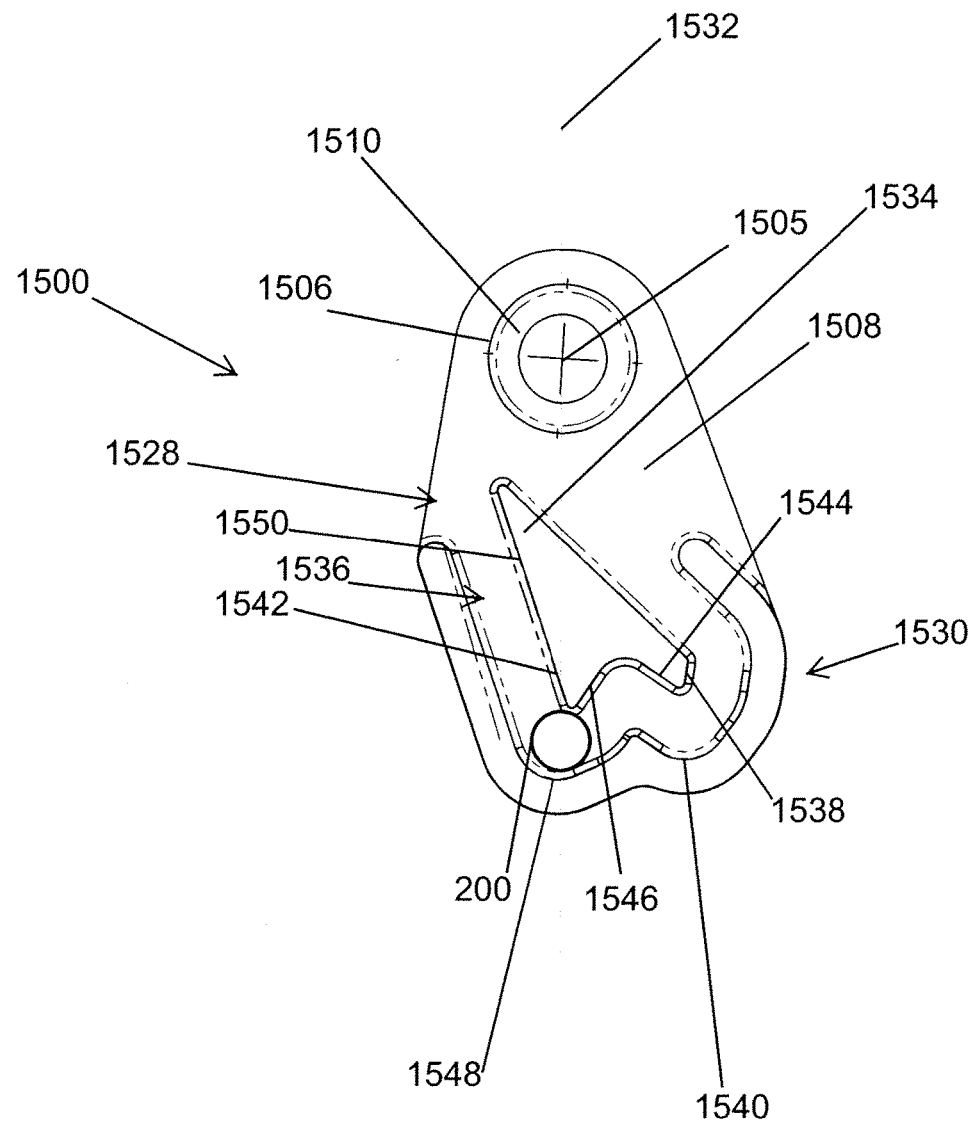
FIG. 21 is a top view of a latch assembly, such as the latch assembly shown in FIG. 15, in a fifth rotational position, according to an exemplary embodiment.

To transition the mounting system 100 from the second position to the first position, the surface mount 102 and device mount 104 are brought together such that the post 200 is removed from the valley 1542, the latch 1500 is rotated counter clock-wise by the biasing member 1522, and biased along the fourth side 1546 and into a valley 1548 in the wall 1530. Contact between the post 200 and the valley 1548 prevents the surface mount 102 and the device mount 104 from being brought further together. In this way, the valley 1548 provides a position at which the post 200 is bottomed out. FIG. 21 illustrates the post 200 in the valley 1548.

Figure 22:
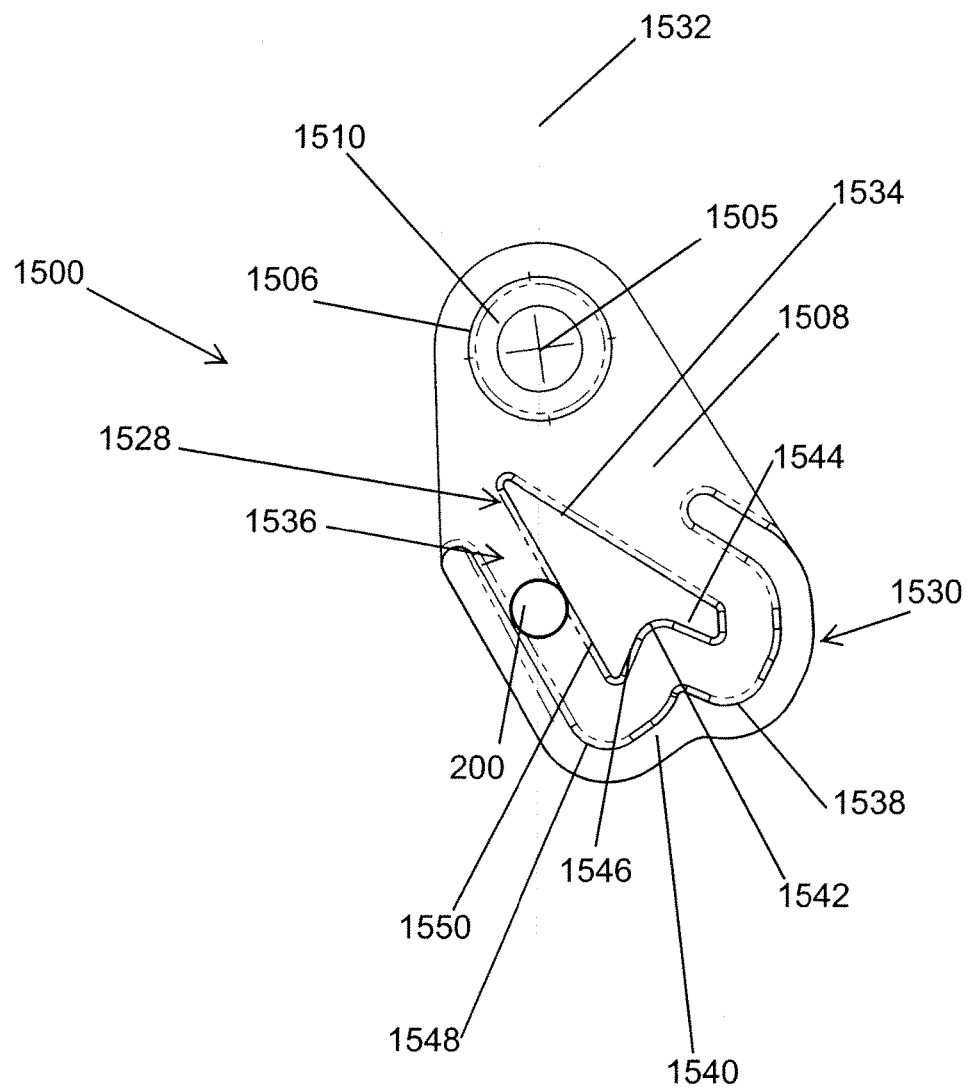
FIG. 22 is a top view of a latch assembly, such as the latch assembly shown in FIG. 15, in a sixth rotational position, according to an exemplary embodiment.
Figure 23:
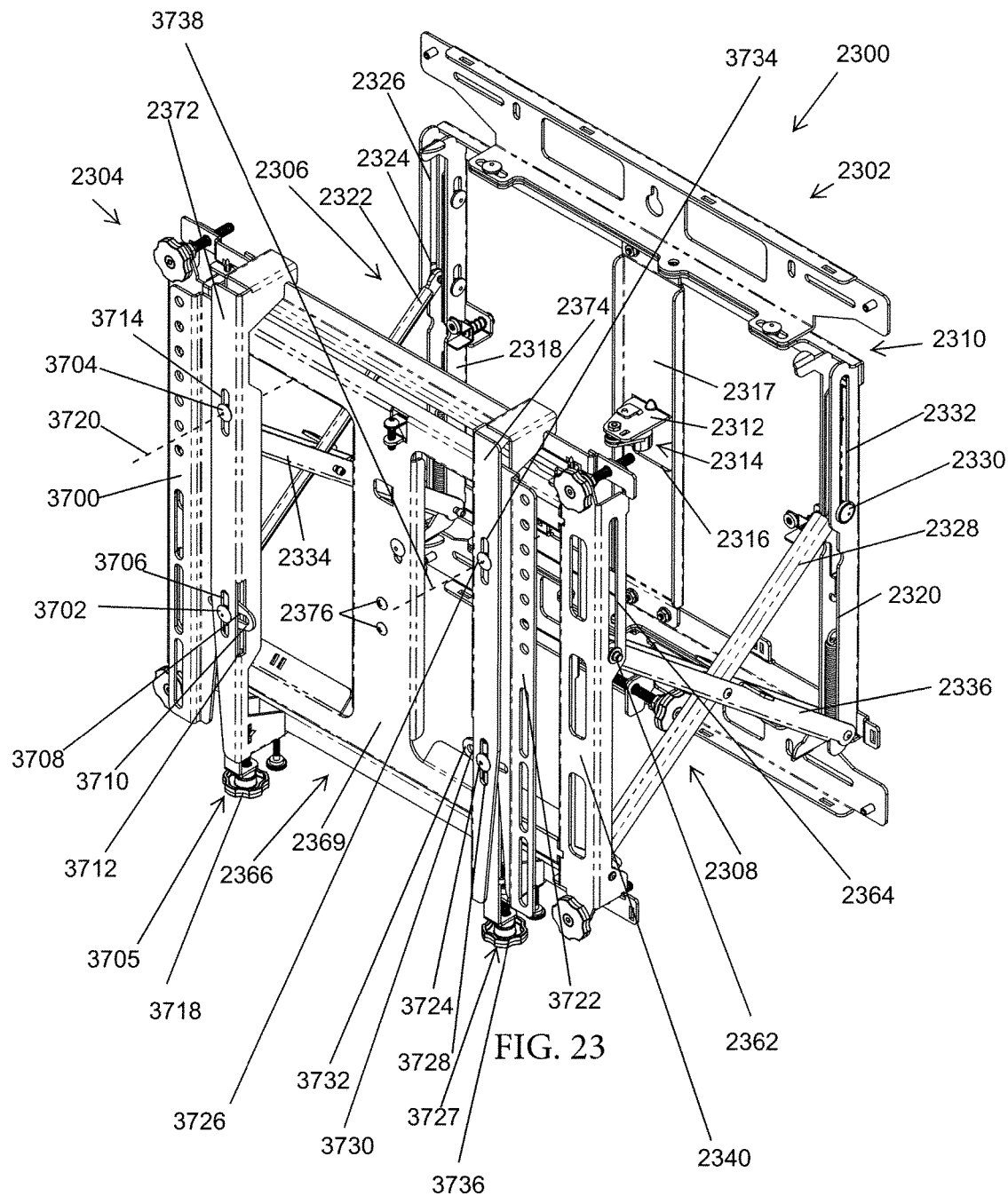
FIG. 23 is a perspective view of a mounting system, according to an exemplary embodiment, in a first position.
Figure 24:
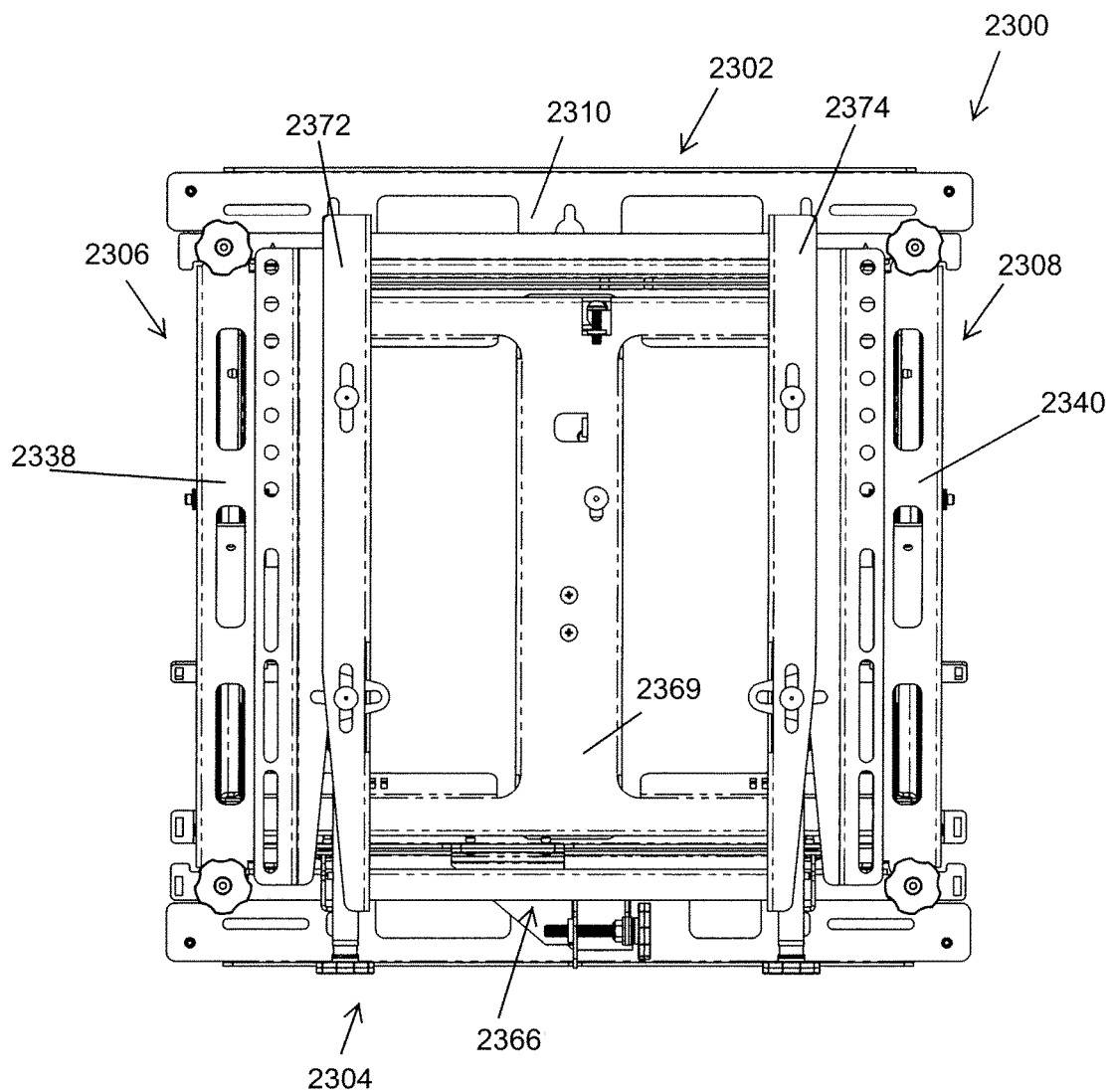
FIG. 24 is a front view of the mounting system shown in FIG. 23.

To continue to transition the mounting system 100 to the first position, the surface mount 102 and device mount 104 are brought apart, such as by the force of gravity on the device mount 104. The post 200 is guided through the track 1536 and rotated counter clock-wise by the biasing member 1522 such that the post 200 is removed from the valley 1548, and is brought into contact with a fifth side 1550 of the guide 1528. FIG. 22 illustrates the post 200 in the track 1536 between the fifth side 1550 of the guide 1528 and the wall 1530.

Further separation of the surface mount 102 and the device mount 104 causes the post 200 to be removed entirely from the track 1536 and to be separated from the guide 1528. When the post 200 no longer contacts the guide 1528, the latch 1500 returns to the first rotational position due to the bias provided by the biasing member 1522. Other configurations of the guide 1528, the wall 1530, and the track 1536 are similarly possible.

FIGS. 23-36 illustrate another mounting system 2300 according to an example embodiment. Like the mounting system 100, the mounting system 2300 is moveable between a first positon (e.g., extended position, configuration, state, etc.), as shown in FIGS. 23-29, and a second position (e.g., collapsed position, retracted position, etc.), as shown in FIGS. 30-36.

The mounting system 2300 includes a surface mount 2302 configured to be selectively coupled to a surface. For example, the surface mount 2302 may be coupled to the surface through the use of fasteners. The mounting system 2300 also includes a device mount 2304 configured to be selectively coupled to a device.

The mounting system 2300 may be used to operatively attach one or more display devices to a surface, a stand, or a portable unit (e.g., rolling stand, rolling display, cart, etc.). Various portions of the mounting system 2300 are selectively movable in relation to each other, such that the position and orientation of the attached display may be adjusted in a plurality of dimensions or degrees of freedom. The various features of the mounting system 2300 provide for independent control of translational and rotational degrees of freedom of the attached display relative to the mounting surface. Through adjustment of the various features of the mounting system 2300, optimization of the position and orientation of the attached display can be achieved relative to a mounting surface and/or adjacent displays, such as when the mounting system 2300 is used in the context of a video wall application including an array of display devices.

The mounting system 2300 also includes a first extension 2306 coupled to the surface mount 2302 and the device mount 2304, and a second extension 2308 coupled to the surface mount 2302 and the device mount 2304. The first extension 2306 and the second extension 2308 cooperate to selectively facilitate transition (e.g., extension, retraction, etc.) of the mounting system 2300 between the first position and the second position. For example, both the first extension 2306 and the second extension 2308 may extend simultaneously as the mounting system 2300 is transitioned from the second position to the first position. Similarly, both the first extension 2306 and the second extension 2308 may collapse simultaneously as the mounting system 2300 is transitioned from the first position to the second position.

The surface mount 2302 includes a base plate 2310 that directly interfaces with the surface to which the surface mount 2302 is coupled. The base plate 2310 includes a mounting panel 2312. The mounting panel 2312 extends away (e.g., orthogonally, etc.) from the base plate 2310 towards the device mount 2304. For example, when the surface mount 2302 is coupled to the surface, the mounting panel 2312 may be substantially horizontal (e.g., orthogonal to the surface, parallel to a ground surface, etc.).

The surface mount 2302 also includes a latch assembly 2314 (e.g., locking assembly, etc.) coupled to the mounting panel 2312. The latch assembly 2314 may be centered on the base plate 2310. For example, the latch assembly 2314 may be centered on the base plate 2310 in a lateral direction (e.g., a direction along the base plate 2310 from the first extension 2306 to the second extension 2308, etc.) and/or a vertical direction (e.g., a direction from a bottom edge of the base plate 2310 to a top edge of the base plate 2310, etc.). As will be described in more detail herein, the latch assembly 2314 selectively couples the device mount 2304 to the surface mount 2302 when the mounting system 2300 is in the second position.

In an example embodiment, the base plate 2310 includes an aperture 2316 (e.g., opening, window, etc.) positioned adjacent the latch assembly 2314 and contiguous with the mounting panel 2312. The mounting panel 2312 may, for example, be cut from the base plate 2310 and formed by deflecting the mounting panel 2312 relative to the base plate 2310, thereby forming the aperture 2316. The aperture 2316 may facilitate rotation of the latch assembly 2314 therein. The aperture 2316 may also facilitate access to the latch assembly 2314 through the base plate 2310. The aperture 2316 and the mounting panel 2312 may be positioned along a central panel 2317 of the base plate 2310.

The surface mount 2302 also includes a first channel 2318 and a second channel 2320. The first channel 2318 and the second channel 2320 may be coupled to, or be integral with, the base plate 2310. A first member 2322 of the first extension 2306 moves (e.g., slides, moves, transitions, etc.) within the first channel 2318. The first member 2322 includes a protrusion 2324 (e.g., protuberance, extension, projection, etc.) extending from the first member 2322 into a slot 2326 in the first channel 2318. The protrusion 2324 is moveable within the slot 2326 between a first position (e.g., a maximum position, etc.) and a second position (e.g., a minimum position, etc.). Similarly, a first member 2328 of the second extension 2308 moves within the second channel 2320. The first member 2328 includes a protrusion 2330 (e.g., protuberance, extension, projection, etc.) extending from the first member 2328 into a slot 2332 in the second channel 2320. The protrusion 2330 is moveable within the slot 2332 between a first position and a second position.

The first extension 2306 also includes a second member 2334 that is rotatably coupled to the first channel 2318. The first member 2322 and the second member 2334 of the first extension 2306 are rotatably coupled (e.g., via a center pin, etc.) such that the protrusion 2324 may be moved within the slot 2326 relative to a location (e.g., fastener, etc.) where the second member 2334 is rotatably coupled to the first channel 2318. Similarly, the second extension 2308 also includes a second member 2336 that is rotatably coupled to the second channel 2320. The first member 2328 and the second member 2336 of the second extension 2308 are rotatably coupled (e.g., via a center pin, etc.) such that the protrusion 2330 may be moved within the slot 2332 relative to a location (e.g., fastener, etc.) where the second member 2336 is rotatably coupled to the second channel 2320.

Similar to the surface mount 2302, the device mount 2304 also includes a first channel 2338 and a second channel 2340. The second member 2334 of the first extension 2306 moves within the first channel 2338. The second member 2334 includes a protrusion 2358 (e.g., protuberance, extension, projection, etc.) extending from the second member 2334 into a slot 2360 in the first channel 2338. The protrusion 2358 is moveable within the slot 2360 between a first position and a second position. Similarly, the second member 2336 of the second extension 2308 moves within the second channel 2340. The second member 2336 includes a protrusion 2362 (e.g., protuberance, extension, projection, etc.) extending from the second member 2336 into a slot 2364 in the second channel 2340. The protrusion 2362 is moveable within the slot 2364 between a first position and a second position.

The first member 2322 of the first extension 2306 is rotatably coupled to the first channel 2338. The first member 2322 and the second member 2334 of the first extension 2306 are rotatably coupled (e.g., via a center pin, etc.) such that the protrusion 2358 may be moved within the slot 2360 relative to a location (e.g., fastener, etc.) where the first member 2322 is rotatably coupled to the first channel 2338. Similarly, the first member 2328 of the second extension 2308 is rotatably coupled to the second channel 2340. The first member 2328 and the second member 2336 of the second extension 2308 are rotatably coupled (e.g., via a center pin, etc.) such that the protrusion 2362 may be moved within the slot 2364 relative to a location (e.g., fastener, etc.) where the first member 2328 is rotatably coupled to the second channel 2340.

The device mount 2304 includes a base plate 2366. The first channel 2338 and the second channel 2340 may be coupled to, or be integral with, the base plate 2366. The base plate 2366 includes a latching panel assembly 2368. The latching panel assembly 2368 may be positioned along a central panel 2369 of the base plate 2366. The latching panel assembly 2368 includes a latching panel 2370 that extends towards the surface mount 2302. The latching panel assembly 2368 is coupled to the base plate 2366 through fasteners 2376. The fasteners 2376 extend from the base plate 2366 into the latching panel 2370. The fasteners 2376 may extend through spacers that function to separate the latching panel 2370 from the base plate 2366.

Figure 25:
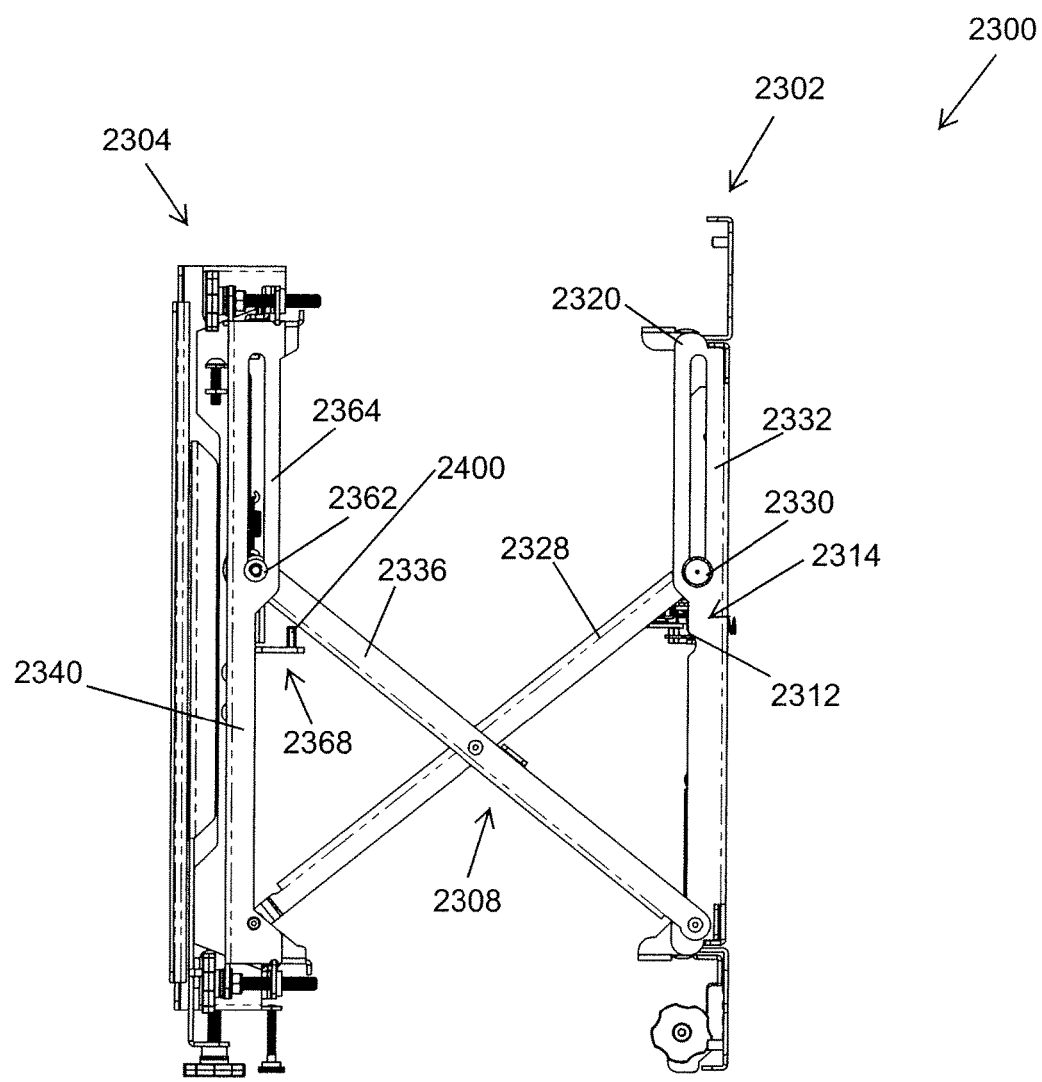
FIG. 25 is a right side view of the mounting system shown in FIG. 23.
Figure 26:
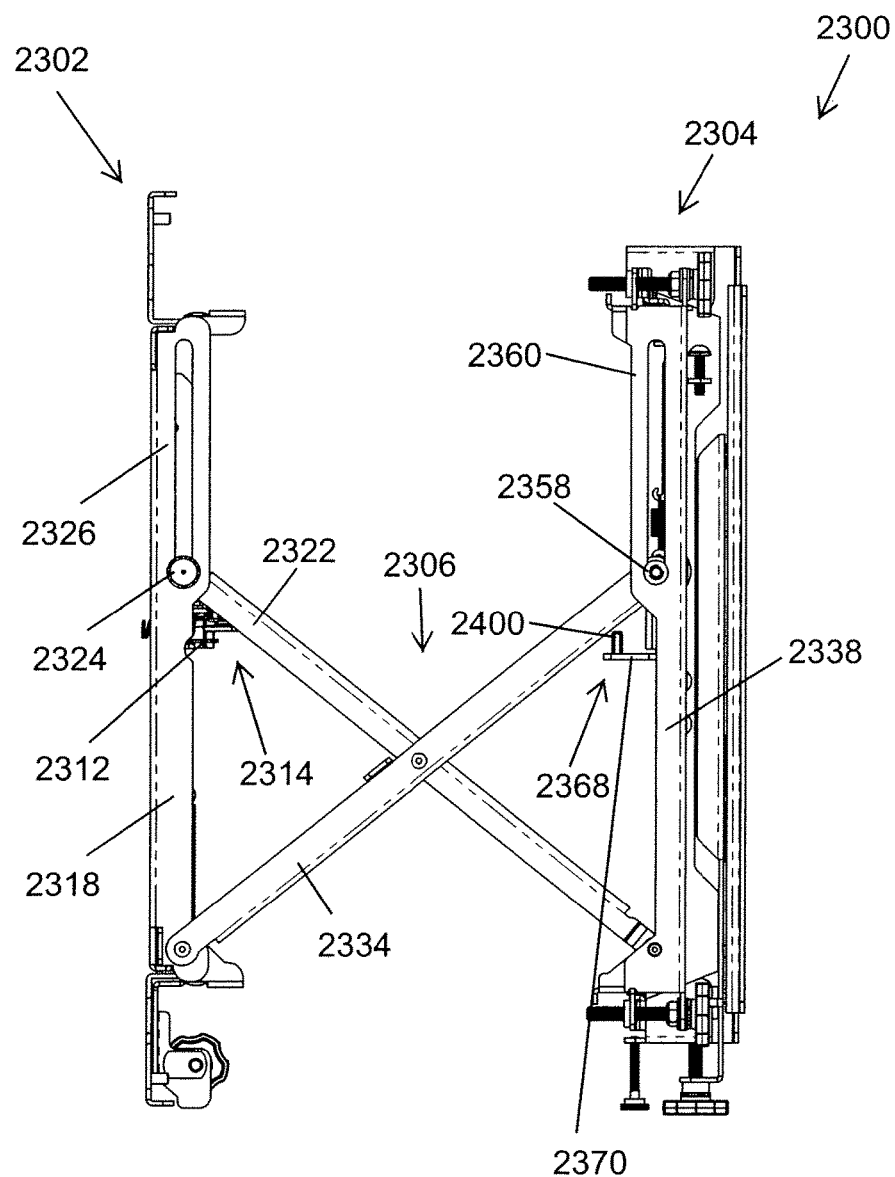
FIG. 26 is a left side view of the mounting system shown in FIG. 23.
Figure 27:
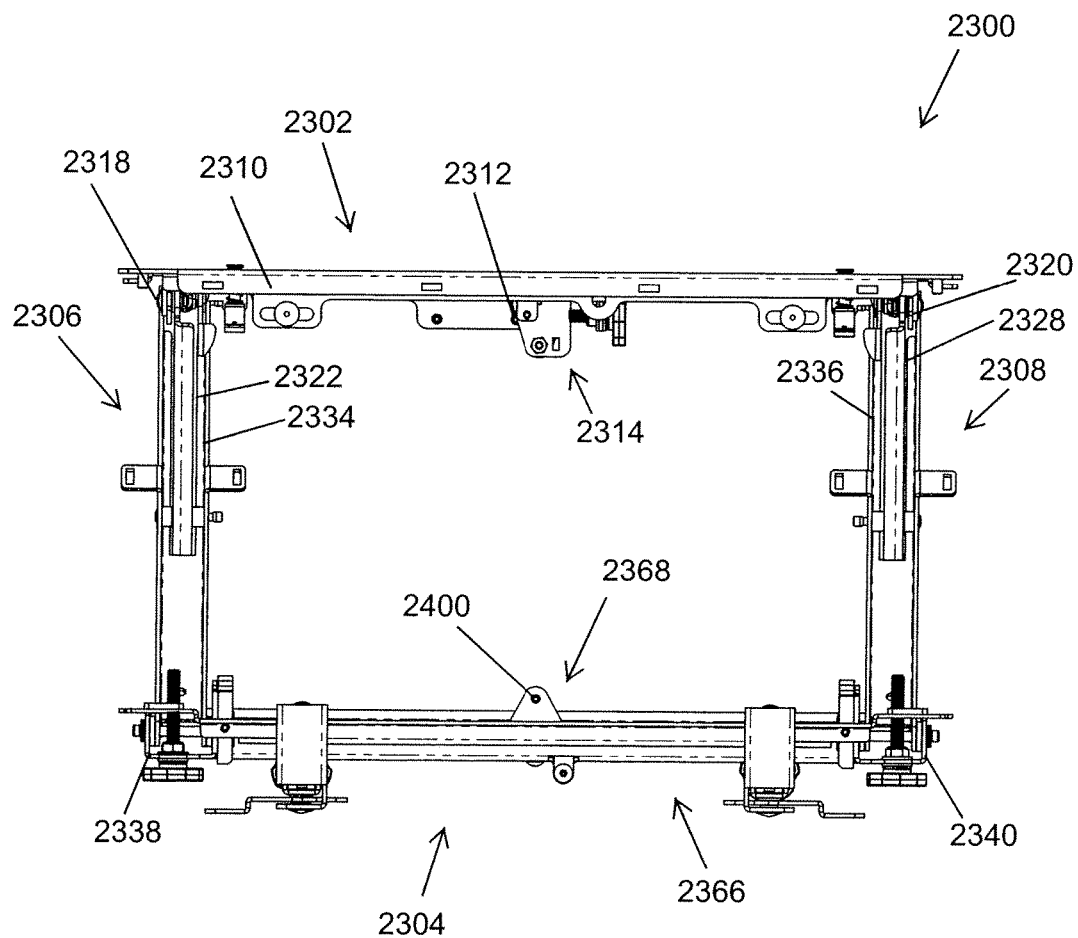
FIG. 27 is a top view of the mounting system shown in FIG. 23.
Figure 28:
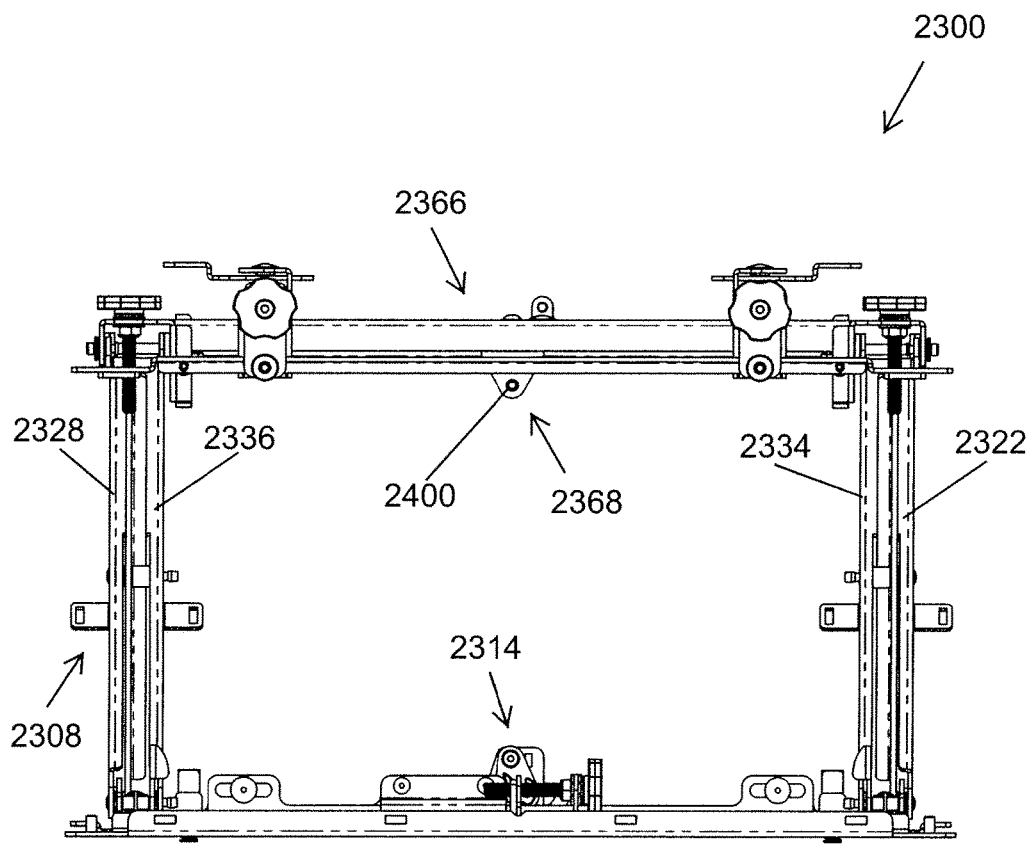
FIG. 28 is a bottom view of the mounting system shown in FIG. 23.
Figure 29:
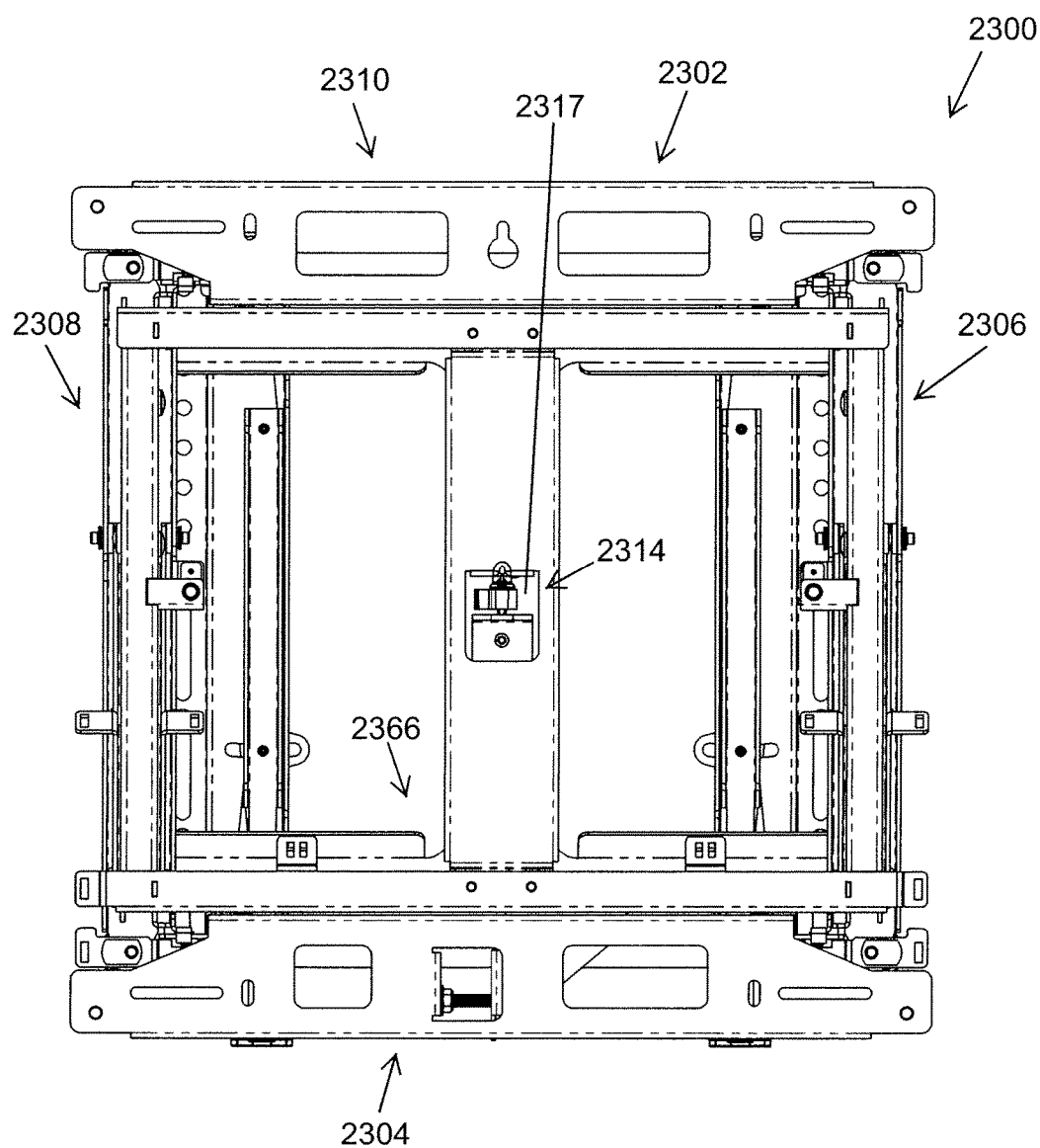
FIG. 29 is a rear view of the mounting system shown in FIG. 23.
Figure 30:
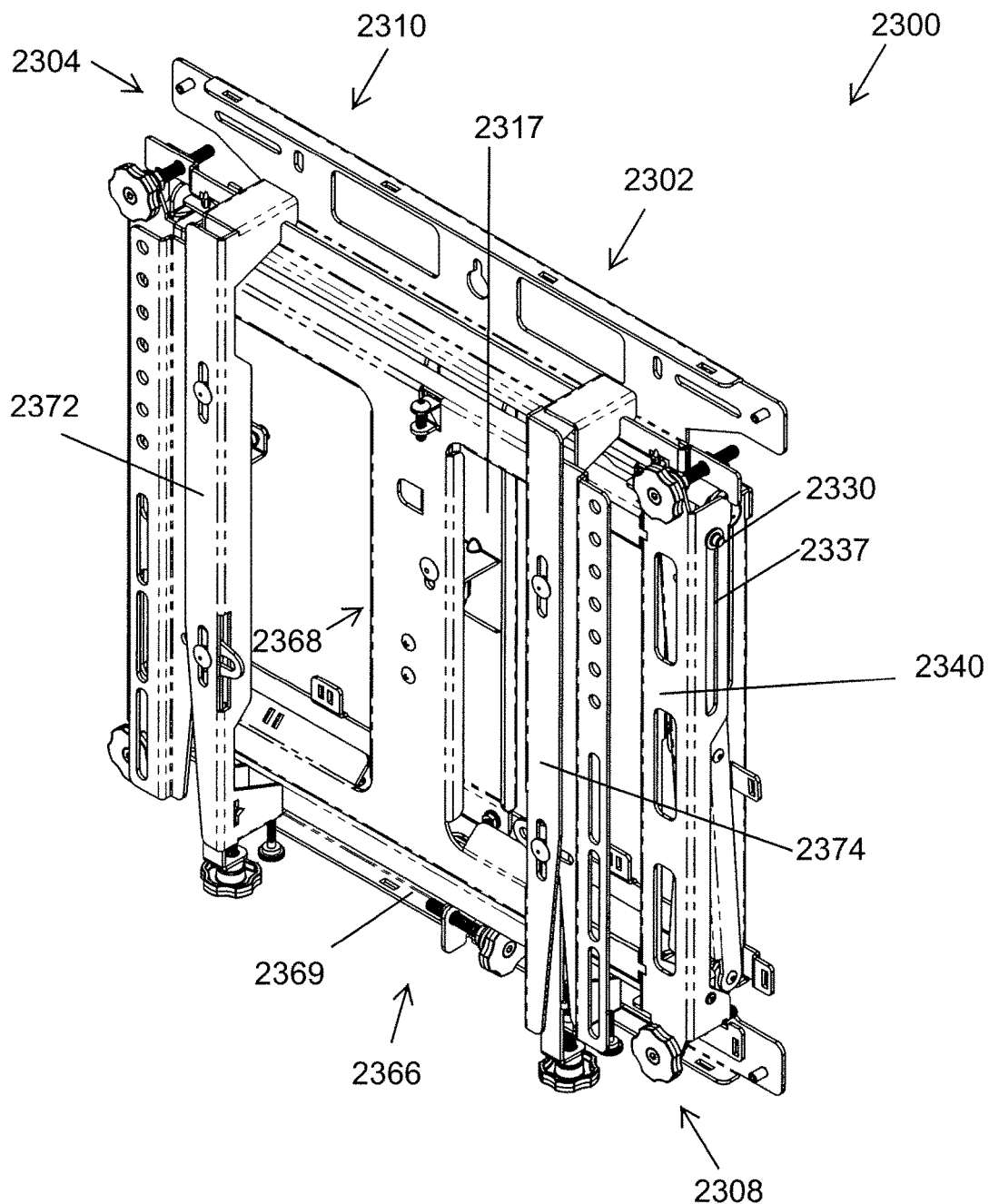
FIG. 30 is a perspective view of the mounting system shown in FIG. 23 in a second position.
Figure 31:
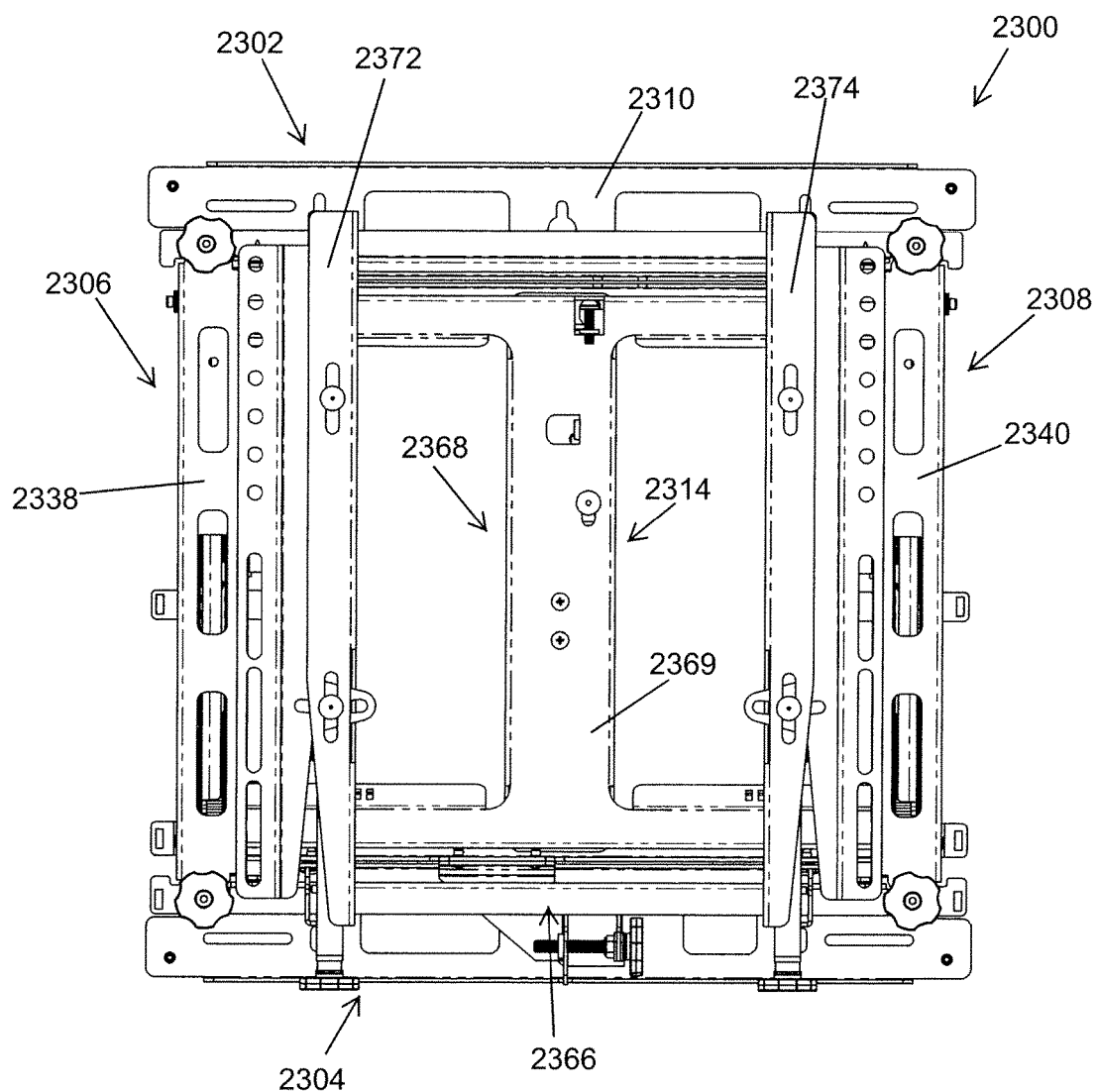
FIG. 31 is a front view of the mounting system shown in FIG. 8.
Figure 32:
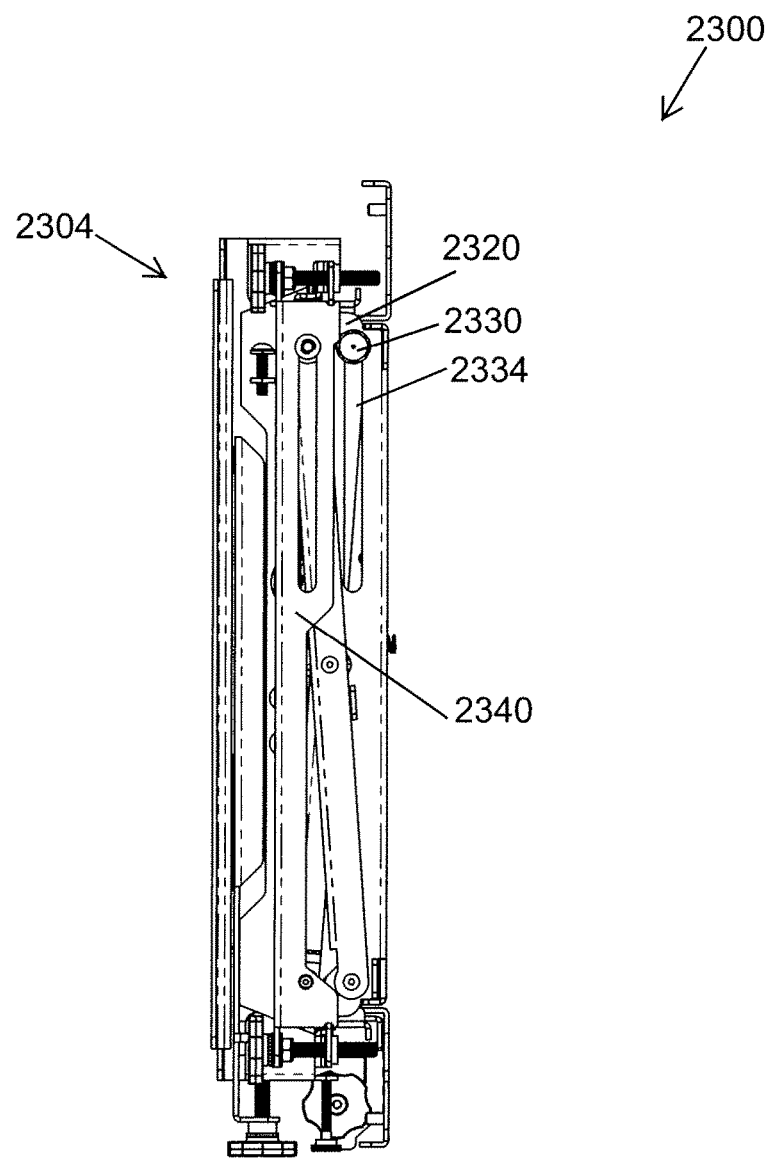
FIG. 32 is a right side view of the mounting system shown in FIG. 8.
Figure 33:
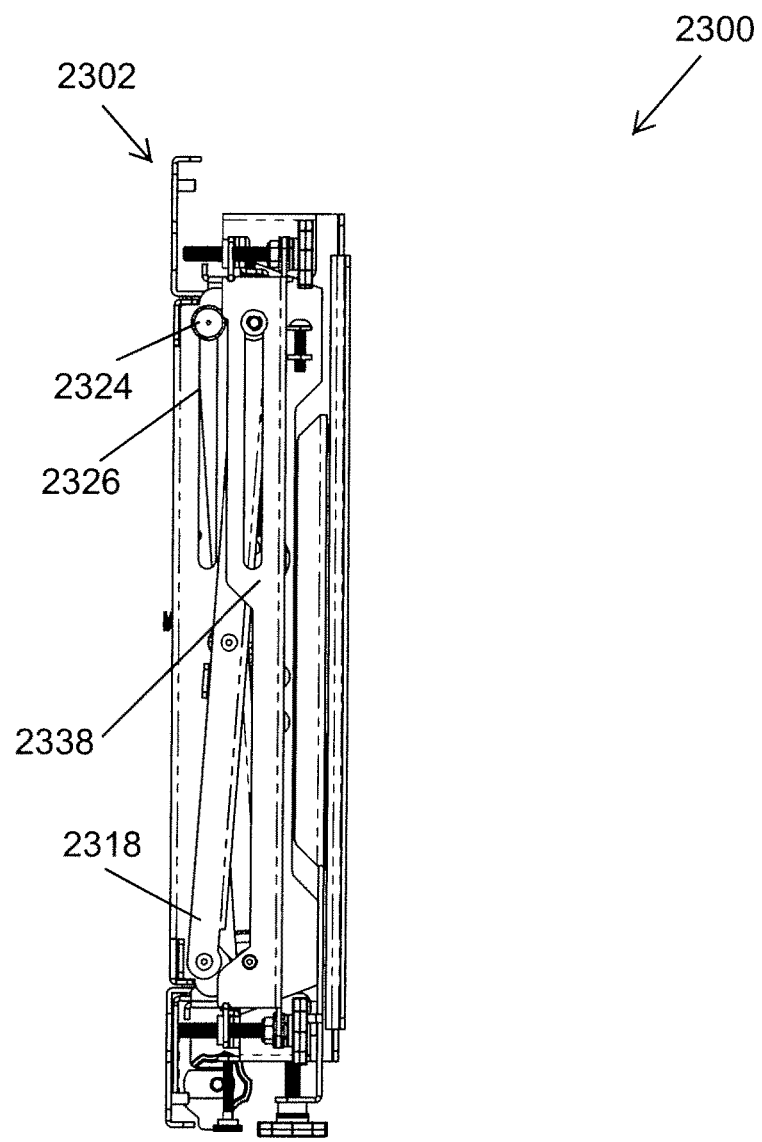
FIG. 33 is a left side view of the mounting system shown in FIG. 8.
Figure 34:
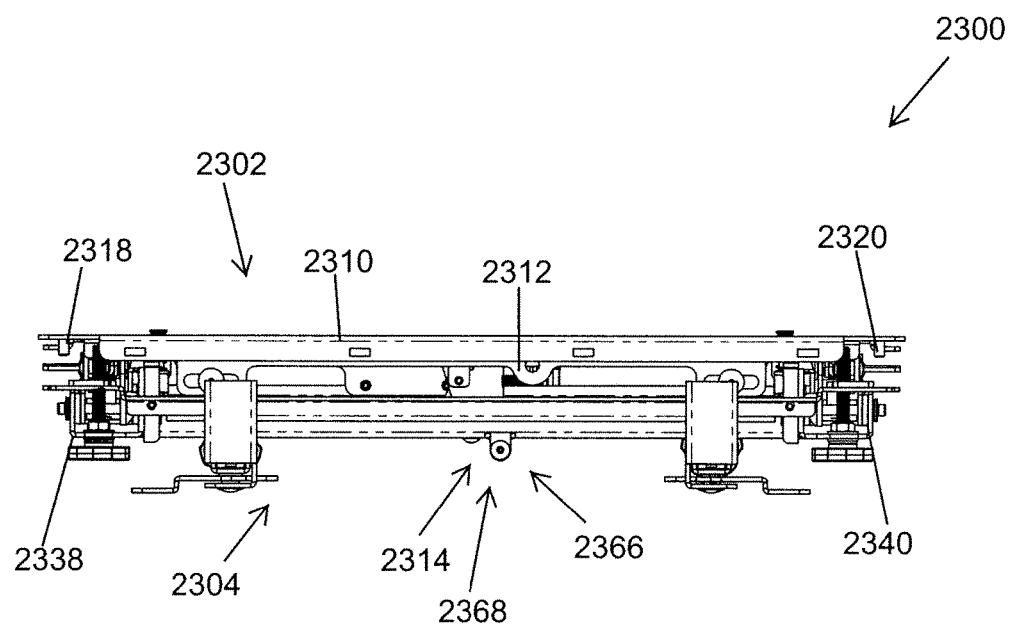
FIG. 34 is a top view of the mounting system shown in FIG. 8.
Figure 35:
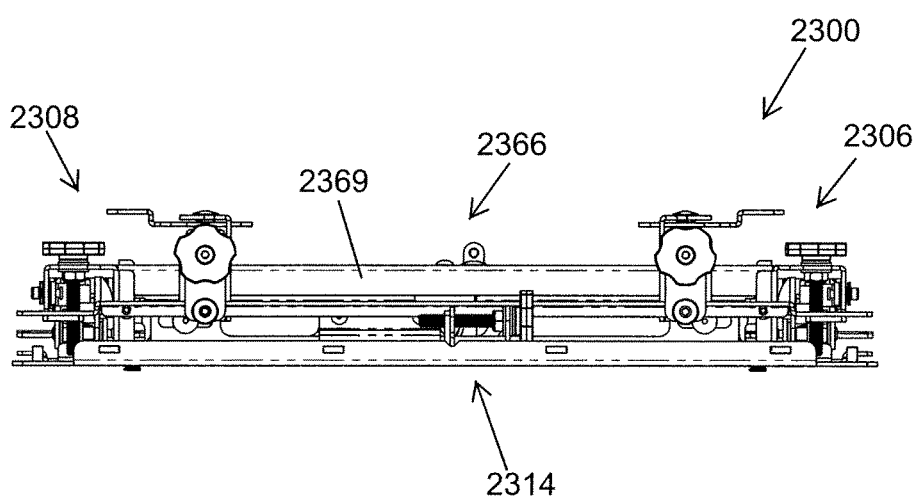
FIG. 35 is a bottom view of the mounting system shown in FIG. 8.
Figure 36:
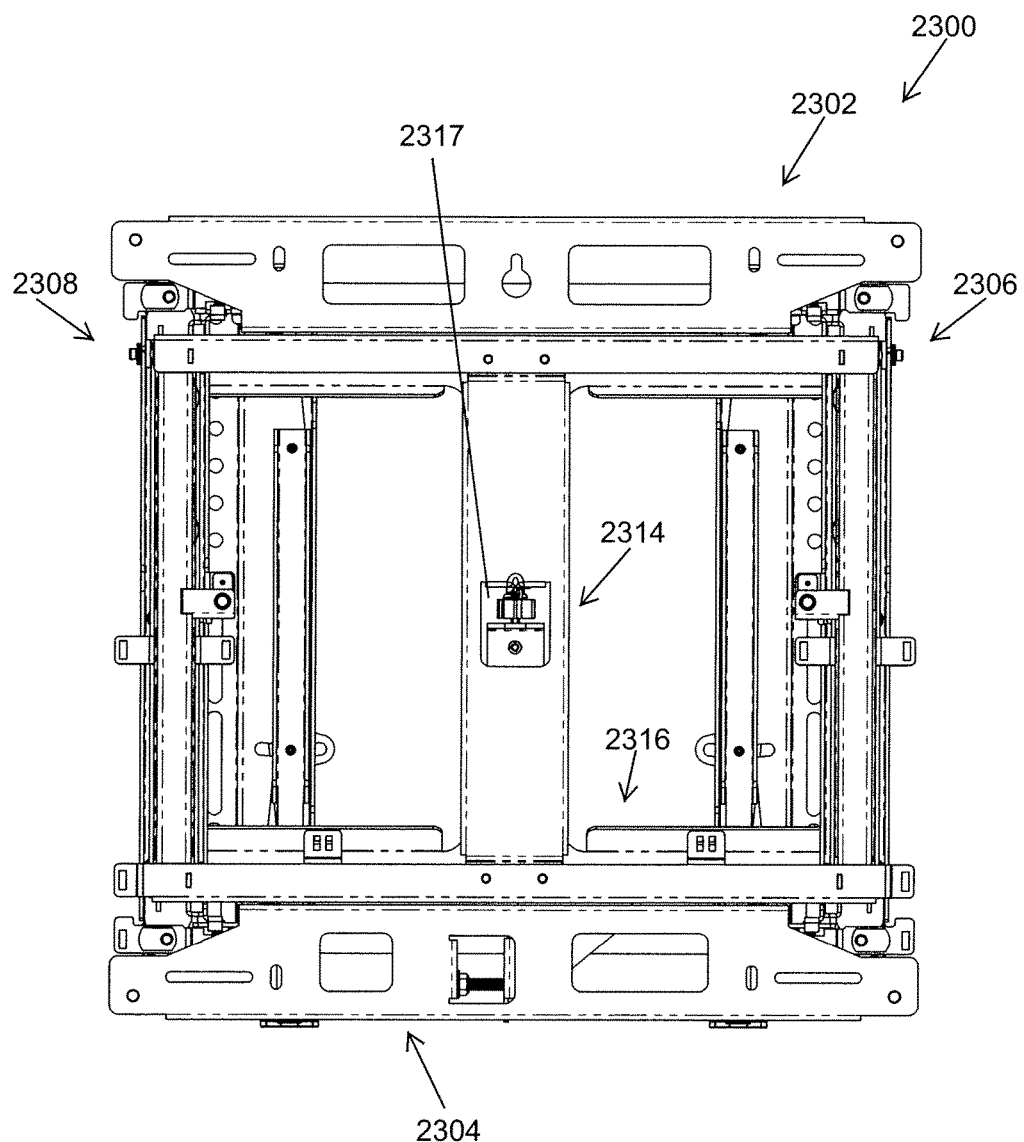
FIG. 36 is a rear view of the mounting system shown in FIG. 8.

As shown in FIG. 25, the latching panel assembly 2368 also includes a post 2400 (e.g., projection, protuberance, extension, pillar, etc.). The post 2400 extends upwardly (e.g., away from a ground surface, etc.) from the latching panel 2370 of the latching panel assembly 2368. In some embodiments, the post 2400 extends away (e.g., orthogonally, etc.) from the latching panel 2370. However, in other embodiments the post 2400 extends at an angle relative to the latching panel 2370. The post 2400 interfaces with the latch assembly 2314 such that the latching panel assembly 2368 is selectively secured within the latch assembly 2314 thereby preventing separation of the surface mount 2302 and the device mount 2304.

The device mount 2304 also includes a first hook bracket 2372 and a second hook bracket 2374. The first hook bracket 2372 and the second hook bracket 2374 are configured to facilitate height adjustment (e.g., vertical repositioning, etc.) of a device coupled to the device mount 2304. For example, if it is desired to raise the device, the first hook bracket 2372 and the second hook bracket 2374 may be adjusted to raise the device a target amount. As this height adjustment is performed, rotational adjustment is simultaneously performed to mitigate any binding that may occur due to the height adjustment.

Figure 37:
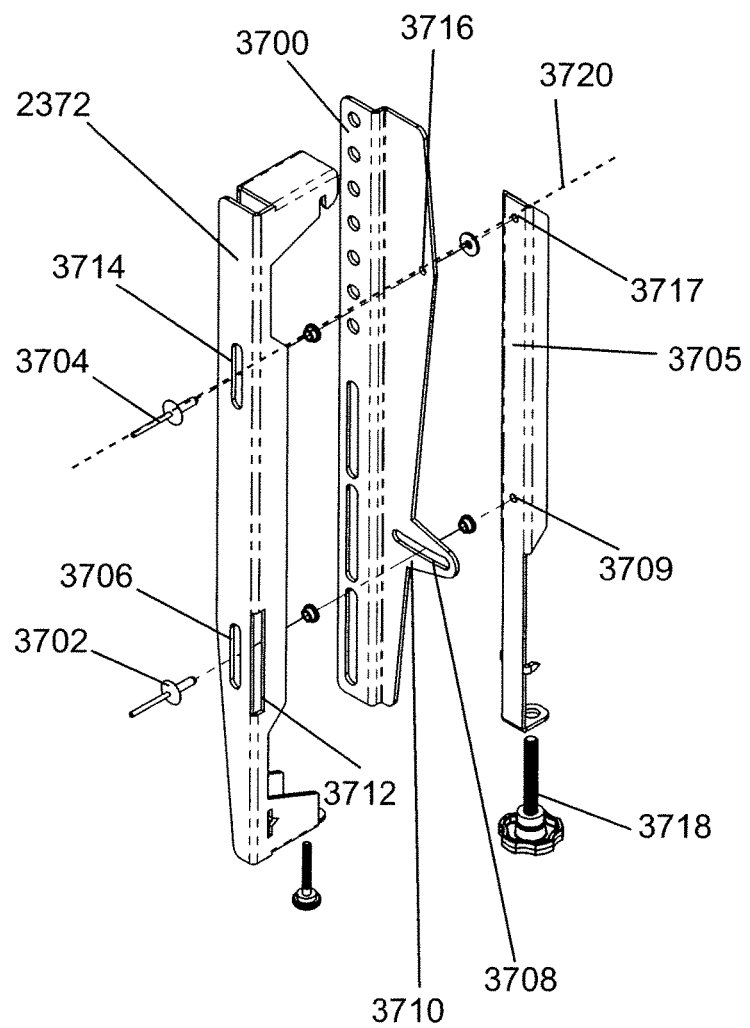
FIG. 37 is a perspective exploded view of a portion of the mounting system shown in FIG. 23, according to an exemplary embodiment.
Figure 38:
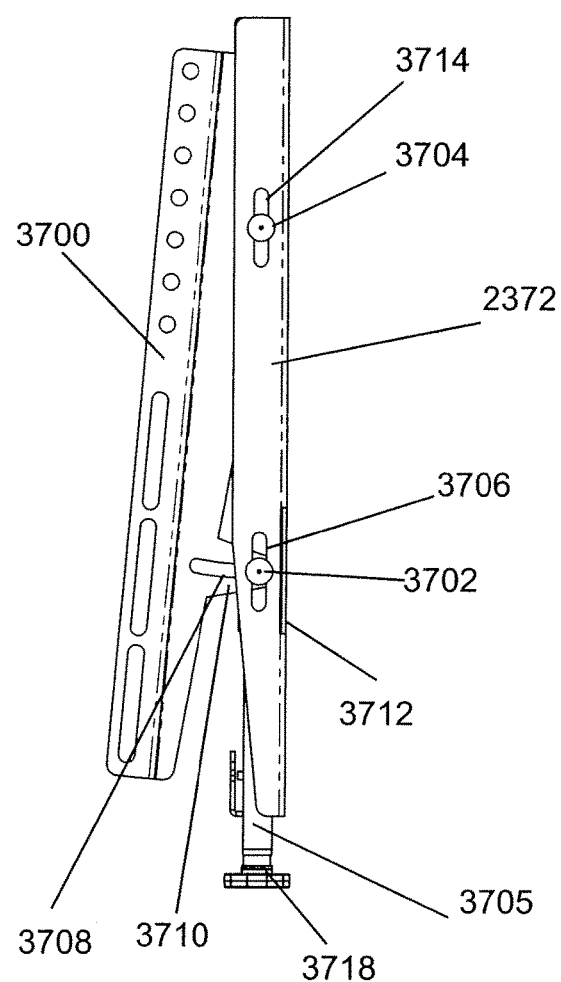
FIG. 38 is a front view of a portion of the mounting system shown in FIG. 23, according to an exemplary embodiment.

The first hook bracket 2372 is coupled to a first mounting bracket 3700 through a first fastener 3702 and a second fastener 3704. The device mount 2304 is coupled to the device through the first mounting bracket 3700. FIGS. 37 and 38 illustrate the first mounting bracket 3700 with other components of the mounting system 2300 hidden.

In an example embodiment, the first fastener 3702 and the second fastener 3704 are rivets. The first mounting bracket 3700 is configured to cooperate with the first hook bracket 2372 to reposition the device with respect to the first hook bracket 2372. The first hook bracket 2372 and the first mounting bracket 3700 are coupled to a first height adjustor

3705. The first height adjustor 3705 is configured to be adjusted by a user to reposition a height of the first mounting bracket 3700 within the first hook bracket 2372.

The first fastener 3702 extends through a slot 3706 in the first hook bracket 2372, into a slot 3708 in the first mounting bracket 3700, and into a first aperture 3709 in the first height adjustor 3705. The slot 3708 is positioned within a projection 3710 extending from the first mounting bracket 3700 and through a slot 3712 in the first hook bracket 2372. The slot 3708 is arcuate in shape to facilitate rotation of the first mounting bracket 3700 with respect to the first hook bracket 2372. The second fastener 3704 extends through a slot 3714 in the first hook bracket 2372, through an aperture 3716 on the first mounting bracket 3700, and into a second aperture 3717 in the first height adjustor 3705.

The first height adjustor 3705 includes a knob 3718 upon which the first height adjustor 3705 rests and that is threadably coupled to the first hook bracket 2372 such that rotation of the knob 3718 causes height adjustment of the first height adjustor 3705 with respect to the first hook bracket 2372. This height adjustment of the first height adjustor 3705 is transferred to the first mounting bracket 3700 through the first fastener 3702 and the second fastener 3704, which are correspondingly repositioned within the slot 3706 and the slot 3714, respectively.

As the height of the first mounting bracket 3700 is adjusted utilizing the first height adjustor 3705, the first mounting bracket 3700 may be rotated about the second fastener 3704 which is centered on an axis of rotation 3720. This rotation of the first mounting bracket 3700 causes the projection 3710 to be repositioned within the slot 3712 in the first hook bracket 2372, and correspondingly causes the first fastener 3702 to be repositioned within the slot 3708 in the projection 3710. In this way, binding that occurs during height adjustment of the first mounting bracket 3700 is mitigated without specific input or adjustment from the user. As a result, the first mounting bracket 3700 may be, for example, positioned as is shown in FIG. 38.

Similarly, the second hook bracket 2374 is coupled to a second mounting bracket 3722 through a first fastener 3724 and a second fastener 3726. The device mount 2304 is coupled to the device through the second mounting bracket 3722. In an example embodiment, the first fastener 3724 and the second fastener 3726 are rivets. The second mounting bracket 3722 is configured to cooperate with the second hook bracket 2374 to rotationally reposition the device with respect to the second hook bracket 2374. The second hook bracket 2374 and the second mounting bracket 3722 are coupled to a second height adjustor 3727. The second height adjustor 3727 is configured to be adjusted by a user to reposition a height of the second mounting bracket 3722 within the second hook bracket 2374.

The first fastener 3724 extends through a slot 3728 in the second hook bracket 2374, into a slot 3730 in the second mounting bracket 3722, and into a first aperture, similar to the first aperture 3709, in the second height adjustor 3727. The slot 3730 is positioned within a projection 3732 extending from the second mounting bracket 3722 and through a slot, similar to the slot 3712, in the second hook bracket 2374. The slot 3730 is arcuate in shape to facilitate rotation of the second mounting bracket 3722 with respect to the second hook bracket 2374. The second fastener 3726 extends through a slot 3734 in the second hook bracket 2374, through an aperture similar to the aperture 3716 on the second mounting bracket 3722, and into a second aperture similar to the second aperture 3717 in the second height adjustor 3727.

The second height adjustor 3727 includes a knob 3736 upon which the second height adjustor 3727 rests and that is threadably coupled to the second hook bracket 2374 such that rotation of the knob 3736 causes height adjustment of the second height adjustor 3727 with respect to the second hook bracket 2374. This height adjustment of the second height adjustor 3727 is transferred to the second mounting bracket 3722 through the first fastener 3724 and the second fastener 3726, which are correspondingly repositioned within the slot 3728 and the slot 3734 in the second hook bracket 2374, respectively.

As the height of the second mounting bracket 3722 is adjusted utilizing the second height adjustor 3727, the second mounting bracket 3722 may be rotated about the second fastener 3726 which is centered on an axis of rotation 3738. This rotation of the second mounting bracket 3722 causes the projection 3732 to be repositioned within the slot in the second hook bracket 2374, and correspondingly causes the first fastener 3724 to be repositioned within the slot 3730 in the projection 3732. In this way, binding that occurs during height adjustment of the second mounting bracket 3722 is mitigated without specific input or adjustment from the user.

Figure 39:
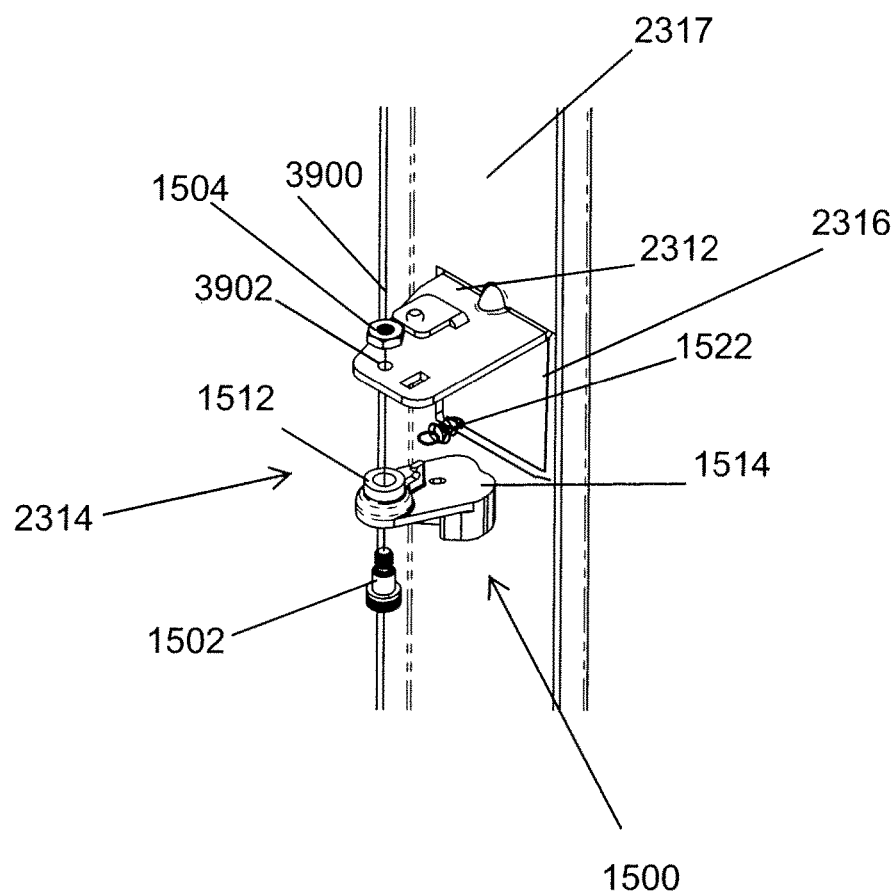
FIG. 39 is a perspective exploded view of a latch assembly for a mounting system, such as the mounting system shown in FIG. 23, according to an exemplary embodiment.

FIG. 39 illustrates the latch assembly 2314 in greater detail. The latch assembly 2314 includes the latch 1500 as previously described. The latch 1500 is rotatably coupled to the mounting panel 2312. The latch 1500 is configured to selectively rotate in response to movement of the post 2400 with respect to the latch 1500. Rotation of the latch 1500 is configured to selectively cause the latching panel assembly 2368 to be secured within, and to be released from, the latch assembly 2314.

The latch 1500 is rotatably coupled to the mounting panel 2312 through the fastener 1502 and the nut 1504 previously described, such that the latch 1500 rotates about a rotational axis 3900. To couple the latch 1500 to the mounting panel 2312, the fastener 1502 is inserted through the aperture 1506 in the latch 1500 and through an aperture 3902 in the mounting panel 2312, the nut 1504 is coupled to the fastener 1502, and the nut 1504 is tightened on the fastener 1502 such that a head of the fastener 1502 contacts the step 1510 and the nut 1504 contacts the mounting panel 2312 thereby causing contact between the step 1510 and the mounting panel 2312. While not shown, the latch 1500 may incorporate washers, spacers, bushings, or other similar mechanisms positioned on the fastener 1502. For example, a washer may be positioned between the mounting panel 2312 and the latch 1500.

The latch assembly 2314 includes a retainer similar to the retainer 1516 that extends from a top side of the mounting panel 2312. The retainer defines a catch that is configured to receive the biasing member 1522. The guide 1528 and the wall 1530 each define various surfaces that interact with the post 2400 as the mounting system 2300 is transitioned between the first position and the second position. During the transition of the mounting system 2300 between the first position and the second position, the post 2400 is selectively repositioned along the path 1532. The path 1532 intersects the rotational axis 3900 and bisects the guide 1528 when the latch 1500 is in the first rotational position.

A plurality mounting systems 100 and 2300, each configured for attachment to a display device, may be arranged in an array to form a video wall comprising a plurality of display devices. For example, a video wall of mounting systems 100 and/or mounting systems 2300 may include nine display devices arranged in a three-by-three array. In this example, each of the nine displays may be attached to a mounting system 100 or a mounting system 2300 that is secured to a mounting surface.

The positioning features of the plurality of the mounting systems 100 and/or the mounting systems 2300 may be adjusted while the mounting system 100 or the mounting system 2300 is in the extended and/or the retracted positions to precisely position and orientate each of the displays in the array with respect to each other. For example, variations in relative attachment position of the various mounting systems 100 and/or the mounting systems 2300 on the mounting surface, as well as variations in the mounting surface itself and/or other variations, may be overcome via adjustment of the mounting systems 100 and/or the mounting systems 2300. Thus, by installing a plurality of the mounting systems 100 and/or the mounting systems 2300, a video wall may be efficiently erected and adjusted to provide a uniformly orientated and positioned array of displays. Still further, the mounting systems 100 and/or the mounting systems 2300 may be utilized to create specialized mounting effects for a video wall such as translating, pivoting and/or tilting one or more displays or an array row and/or column of the displays relative to another display or an array row and/or column of the displays.

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," and the like, as used herein, mean the joining of two components directly or indirectly to one another. Such joining may be stationary (e.g., permanent) or movable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item, unless specifically stated to the contrary.

What is claimed is:

1. A mounting system, comprising:
   a surface mount configured to be coupled to a surface;
   a device mount coupled to the surface mount and configured to be coupled to a device;
   an extension assembly coupled to the surface mount and the device mount, the extension assembly configured to facilitate the selective repositioning of the device mount in an extended position and a retracted position;
   a latching panel assembly operatively coupled to the device mount, the latching panel assembly comprising a post; and
   a latch assembly operatively coupled to the surface mount and configured to selectively secure the device mount in the retracted position through an interaction with the post, the latch assembly comprising a latch that is rotatable with respect to the surface mount in response to the interaction with the post;
   wherein the latch comprises:
      a guide extending from the latch; and
      a wall extending from the latch, the guide and the wall cooperating to define a track therebetween, the track configured to selectively receive the post such that the post is movable within the track, the track defining a first stop position, a second stop position, and a third stop position;
   wherein the device mount is prevented from being brought closer to the surface mount by an interaction between the post and the wall when the post is located in the first stop position or the third stop position; and
   wherein the device mount is in the retracted position when the post is located in the second stop position.

2. The mounting system of claim 1, wherein the surface mount comprises a base plate defining a mounting panel extending away from the base plate; and
   wherein the latch is rotatably coupled to the mounting panel.

3. The mounting system of claim 2, further comprising a biasing member;
   wherein the mounting panel comprises a first retainer extending from the mounting panel;
   wherein the biasing member is coupled to the first retainer and to the latch such that the latch is biased by the biasing member towards a first rotational position; and
   wherein the latch is proximate the first rotational position when the post is located in the second stop position.

4. The mounting system of claim 3, wherein the latch comprises;
   a first surface and a second surface opposite the first surface, the first surface and the second surface each parallel to the mounting panel; and
   a second retainer extending from the second surface and coupled to the biasing member; and
   wherein the guide and the wall extend from the first surface.

5. The mounting system of claim 2, wherein movement of post within the track selectively causes the post to contact the guide or the wall; and wherein contact between the post and the guide selectively causes rotation of the latch with respect to the mounting panel.

6. The mounting system of claim 1, wherein the track is configured such that the post is movable within the track from the first stop position to the second stop position and from the second stop position to the third stop position.

7. The mounting system of claim 1, wherein the device mount comprises a base plate defining an aperture;
wherein the latching panel assembly is operatively coupled to the base plate proximate the aperture; and
wherein the aperture is configured to receive a portion of the latch assembly when the device mount is in the retracted position.

8. The mounting system of claim 1, wherein the device mount comprises:
a base plate;
a hook bracket operatively coupled to the base plate;
a mounting bracket operatively coupled to the hook bracket; and
a height adjustor operatively coupled to the hook bracket and the mounting bracket, the height adjustor movable relative to the hook bracket to cause repositioning of the mounting bracket relative to the hook bracket.

9. The mounting system of claim 8, wherein the hook bracket defines:
a first slot configured to receive a first fastener;
a second slot configured to receive a second fastener; and
a third slot;
wherein the mounting bracket comprises a projection extending from the mounting bracket and a fourth slot positioned within the projection, the fourth slot configured to receive the second fastener; and
wherein the third slot is configured to receive the projection.

10. The mounting system of claim 9, wherein the mounting bracket further comprises a first aperture configured to receive the first fastener; and
wherein the height adjustor comprises a second aperture configured to receive the first fastener and a third aperture configured to receive the second fastener.

11. The mounting system of claim 10, wherein the first fastener is positioned within the first slot, the first aperture, and the second aperture;
wherein the second fastener is positioned within the second slot, the fourth slot, and the third aperture; and
wherein movement of the first fastener within the first slot and movement of the second fastener within the second slot causes corresponding movement of the second fastener.

12. A mounting system, comprising:
a surface mount configured to be coupled to a surface, the surface mount comprising:
a first base plate;
a mounting panel extending away from the first base plate; and
a latch rotatably coupled to the mounting panel, the latch comprising:
a guide extending from the latch; and
a wall extending from the latch, the guide and the wall cooperating to define a track therebetween, the track defining a first stop position, a second stop position, and a third stop position;
a device mount operatively coupled to the surface mount and configured to be coupled to a device, the device mount comprising:
a second base plate;
a latching panel extending away from the second base plate; and
a post extending from the latching panel and configured to be selectively received within the track such that the post is movable within the track, the post being selectively repositionable by the device mount to interface with the latch such that the device mount is selectively secured to, and released from, the surface mount; and
an extension assembly operatively coupled to the surface mount and the device mount, the extension assembly configured to facilitate the selective repositioning of the device mount with respect to the surface mount;
wherein the device mount is prevented from being brought closer to the surface mount by an interaction between the post and the wall when the post is located in the first stop position or the third stop position; and
wherein the device mount is prevented from being brought apart from the surface mount when the post is located in the second stop position.

13. The mounting system of claim 12, wherein the device mount further comprises:
a hook bracket operatively coupled to the second base plate;
a mounting bracket operatively coupled to the hook bracket, the mounting bracket configured couple to the device; and
a height adjustor operatively coupled to the hook bracket and the mounting bracket, the height adjustor movable relative to the hook bracket so as to cause repositioning of the mounting bracket relative to the hook bracket.

14. The mounting system of claim 13, wherein the hook bracket comprises:
a first slot configured to receive a first fastener;
a second slot configured to receive a second fastener; and
a third slot;
wherein the mounting bracket comprises a projection extending from the mounting bracket and a fourth slot positioned within the projection, the projection configured to be received in the third slot and the fourth slot configured to receive the second fastener;
wherein the mounting bracket further comprises a first aperture configured to receive the first fastener and the height adjustor comprises a second aperture configured to receive the first fastener and a third aperture configured to receive the second fastener.

15. The mounting system of claim 14, wherein the first fastener is positioned within the first slot, the first aperture, and the second aperture;
wherein the second fastener is positioned within the second slot, the fourth slot, and the third aperture; and
wherein movement of the first fastener within the first slot and movement of the second fastener within the second slot causes corresponding movement of the second fastener within the fourth slot.

16. A mounting system, comprising:
a surface mount configured to be coupled to a surface;
a device mount coupled to the surface mount, the device mount comprising:
a base plate;
a hook bracket operatively coupled to the base plate, the hook bracket comprising:
a first slot receiving a first fastener;
a second slot receiving a second fastener; and
a third slot;

a mounting bracket operatively coupled to the hook bracket, the mounting bracket configured to be coupled to a device, and comprising:
a projection extending from the mounting bracket; and
a fourth slot positioned within the projection, the fourth slot receiving the second fastener; and
a height adjustor operatively coupled to the hook bracket and the mounting bracket, the height adjustor movable relative to the hook bracket so as to cause repositioning of the mounting bracket relative to the hook bracket; and
an extension assembly operatively coupled to the surface mount and the device mount;
wherein the third slot receives the projection; and
wherein movement of the first fastener within the first slot and movement of the second fastener within the second slot causes corresponding movement of the second fastener within the fourth slot.

17. The mounting system of claim 16, further comprising a biasing member;
wherein the surface mount comprises a latch rotatably coupled to the surface mount;
wherein the surface mount comprises a first retainer;
wherein the latch comprises a second retainer;
wherein the biasing member is coupled to the first retainer and the second retainer such that the latch is biased by the biasing member to a first rotational position.

18. The mounting system of claim 17, wherein the device mount further comprises a post coupled to the base plate;
wherein the extension assembly is configured to facilitate selective repositioning of the post to cause the post to interface with the latch such that the device mount is selectively secured to, and released from, the surface mount; and
wherein the latch further comprises a guide and a wall extending from a surface of the latch, the guide and the wall cooperating to define a track therebetween that is configured to selectively receive the post such that the post is movable within the track to selectively cause the post to contact the guide or the wall to cause rotation of the latch with respect to the surface mount.

19. The mounting system of claim 18, wherein the mounting bracket further comprises a first aperture receiving the first fastener; and
wherein the height adjustor comprises:
a second aperture receiving the first fastener; and
a third aperture receiving the second fastener.

20. The mounting system of claim 18, wherein the track is configured to selectively receive the post such that the post is movable within the track;
wherein the track defines a first stop position, a second stop position, and a third stop position;
wherein the device mount is prevented from being brought closer to the surface mount by an interaction between the post and the wall when the post is located in the first stop position or the third stop position; and
wherein the device mount is secured to the surface mount when the post is located in the second stop position.

* * * * *